(12) United States Patent
Sone

(10) Patent No.: US 6,816,217 B2
(45) Date of Patent: Nov. 9, 2004

(54) TRANSFLECTIVE LIQUID-CRYSTAL DISPLAY DEVICE

(75) Inventor: Takehiko Sone, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 10/349,589

(22) Filed: Jan. 23, 2003

(65) Prior Publication Data

US 2003/0147030 A1 Aug. 7, 2003

(30) Foreign Application Priority Data

Jan. 25, 2002 (JP) .................................. 2002-017326

(51) Int. Cl.[7] .............................................. B02F 1/1335
(52) U.S. Cl. ...................... 349/114; 349/119; 349/102; 349/113
(58) Field of Search ........................ 349/113–114, 117, 349/119, 106, 102, 112

(56) References Cited

U.S. PATENT DOCUMENTS

| | | | | |
|---|---|---|---|---|
| 4,398,805 A | * | 8/1983 | Cole | 349/68 |
| 6,449,992 B1 | * | 9/2002 | Yu et al. | 70/58 |
| 6,501,521 B2 | * | 12/2002 | Matsushita et al. | 349/106 |
| 6,522,377 B2 | * | 2/2003 | Kim et al. | 349/114 |
| 6,654,087 B2 | * | 11/2003 | Song et al. | 349/113 |

FOREIGN PATENT DOCUMENTS

JP 2001-281649 10/2001

* cited by examiner

*Primary Examiner*—Toan Ton
(74) *Attorney, Agent, or Firm*—Brinks Hofer Gilson & Lione

(57) ABSTRACT

A liquid crystal layer is composed of a liquid crystal composition having a positive dielectric anisotropy, and the liquid crystal composition is sandwiched by a pair of transparent substrates while being twisted by 220 to 260 degrees. Also, in a liquid crystal display device having an optical compensating plate and a polarizer respectively formed above and below a liquid crystal cell, a transflector is formed on the inner surface of the transparent substrate of the liquid crystal cell, the transflector has a high-reflectivity film having a plurality of fine apertures therein, and the high-reflectivity film has a diffuse reflection surface, on the surface thereof, having a controlled reflected luminance characteristic.

38 Claims, 14 Drawing Sheets

TRANSFLECTIVE LIQUID-CRYSTAL DISPLAY DEVICE

BACKGROUND OF THE INVENTION

1. Field of the Invention

The present invention relates to transflective liquid-crystal display devices of the super twisted nematic (STN) type, and more particularly, the present invention relates to a transflective liquid-crystal display device having excellent display features not only in a reflection mode but also in a transmission mode.

2. Description of the Related Art

Almost all portable phones and portable information terminals are currently equipped with a liquid crystal display device, and most of these portable electronic apparatuses are currently equipped with a transflective liquid-crystal display device.

Known transflective liquid-crystal display devices, either of the active matrix type or the passive matrix type, are liquid crystal display devices having an external transflector and having a structure in which one of a pair of mutually opposing glass substrates (i.e., the substrate away from the observer) sandwiching a liquid crystal layer therebetween has a transflective sheet, a retardation film, and a polarizer on the lower surface thereof in this order, and the other glass substrate (i.e., the substrate close to the observer) has another retardation film and another polarizer on the upper surface thereof in this order.

Since developments to make color displays and requirements for higher density of display pixels, in particular, cause the above liquid crystal display devices to suffer from blurred display problems due to parallax, color mixing with unwanted colors, and the like, a liquid crystal display device having a built-in transflector, where the transflector is provided on the inner surface of one of the pair of glass substrates (i.e., the substrate away from the observer), has been mainly used.

FIG. 9 illustrates a partial sectional structure of the known liquid crystal display device having a built-in transflector. This transflective liquid-crystal display device has a pair of glass substrates 71 and 72 and a transflector 75, on the upper surface of the lower glass substrate 71 (away from the observer ob), formed by a layer 73 having a concave-convex upper surface so as to provide a diffuse reflection and a high-reflectivity film 74 which is made of Al-based or Ag-based metal film, or the like, and which is stacked on the layer 73. Furthermore, the transflector 75 has a color filter layer 76, a planarizing layer 77, transparent electrodes 78a, and an alignment film 79a formed on the upper surface thereof. The foregoing layer 73 having a concave-convex upper surface has fine concavities and convexities formed in a random manner by treating the upper surface of a transparent substrate such as a glass substrate by sand blasting, etching, or the like. Also, the high-reflectivity film 74 formed on the foregoing layer 73 has fine concavities and convexities 74c on its surface, whose sectional shape exhibits a continuous curve having continuous slopes.

While the lower glass substrate 71 has such a transflector, the upper glass substrate 72 (close to the observer ob) has transparent electrodes 78b and an alignment film 79b formed on the lower surface thereof so as to serve as a counter substrate. The substrate 71 with the transflector and the counter substrate 72 are bonded to each other with a sealant having a loop-like shape in plan view (not shown), and a liquid crystal layer 80 is formed by injecting liquid crystal inside and sealing it in the space enclosed by the pair of glass substrates 71 and 72 and the sealant, so as to provide a liquid crystal cell 81. The upper and lower alignment films 79b and 79a are aligned so that the alignment directions of liquid crystal molecules in the liquid crystal layer 80 are twisted by about 220 to 250 degrees.

Also, the liquid crystal cell 81 has an optical film 82b, made of at least one retardation film, and a polarizer 83b stacked on the upper surface thereof (close to the observer ob) in that order. In addition, the liquid crystal cell 81 has an optical film 82a, formed by a plurality of retardation films, and a polarizer 83a stacked on the lower surface thereof (away from the observer ob) in that order. Furthermore, a backlight unit 100 is disposed below the polarizer 83a.

The backlight unit 100 is formed by a transparent light guide plate 101, a reflecting tube 103 which has a U-shaped cross section and which is disposed so as to oppose one of the side surfaces of the light guide plate 101, a white light source 102, such as a cold cathode fluorescent lamp (CCFL), a white light emitting diode, or the like, housed in the reflecting tube 103, and a reflecting plate 104 disposed on an external surface (the lower surface in the figure) of the light guide plate 101.

The transflective liquid-crystal display device having the above-mentioned backlight unit 100 is used as, for example, a display portion of a portable phone, and the display portion is used by switching between a reflection mode and a transmission mode, wherein, in the reflecting mode, the reflective liquid-crystal display device uses sunlight or external light as a light source and, in the transmission mode, the transmissive liquid-crystal display device uses the backlight unit 100 as a light source.

The transflector 75 exhibiting the foregoing diffuse reflection has the above-described fine concavities formed in a random manner so as to provide a reflected luminance characteristic, shown by a curve (1) in FIG. 10, which exhibits an approximately symmetric distribution with respect to the angle of its specular reflecting direction (an approximate Gaussian distribution), or by another curve (2) in FIG. 10 which exhibits a combined distribution in which the above distribution is added with its specular reflection component. In the transflector 75 having the diffuse reflection exhibiting the foregoing approximately symmetric distribution (approximate Gaussian distribution), the metal thin film high-reflectivity film 74 formed on the foregoing layer 73 has the fine concavities and convexities 74c formed in a random manner on the surface thereof, as shown in FIG. 14, whose sectional shape exhibits a continuous curve having continuous slopes, that is, joining portions (boundaries) 74d between adjacent concavities are formed so as to be convex curves. In the transflector 75 having the diffuse reflection exhibiting the foregoing combined distribution, the foregoing layer 73 has a flat portion formed at a part of the fine concavities formed on the upper surface thereof so that the metal thin film on the flat portion has a reflection characteristic. FIG. 11 illustrates a method for measuring the reflected luminance characteristic of the transflector shown in FIG. 10. With this method, when the upper surface of the transflector 75 is irradiated with incident light (external light) $L_1$ at an incident angle $\theta_1$ (an angle from the normal H), a photo detector 105 detects reflected light $R_1$, which is part of the incident light $L_1$ reflected at the foregoing surface, at an acceptance angle $\theta_a$ from the normal H (0°). A curve (7) in FIG. 13 shows the measured relationship between the reflected luminance vs. an acceptance angle, measured by varying the acceptance angle $\theta_a$ from the normal H (0°) to, for example, 60° while the angle $\theta_1$, which indicates the specular reflecting direction with respect to the surface of the transflector, is set as a center angle.

An example reflector having transflectivity and used in the transflective liquid-crystal display devices is a) the transflector 75 using the metal thin film (high-reflectivity film) 74 with a film thickness of 5 to 40 nm, as shown in FIG. 9, so as to provide an appropriate transmittivity in the visible light region; b) a transflector having a plurality of apertures in a metal film; or the like.

FIG. 12A illustrates a partial sectional structure of another example liquid-crystal display device having the foregoing transflector b), that is, a transflector 75a formed by a layer 73a having concavities and convexities and formed on the surface thereof and by a metal film 74a having a plurality of apertures 74b and formed on the layer 73a. FIG. 12B is a plan view illustrating the positional relationships between the apertures 74b and the upper and lower transparent electrodes 78a and 78b of the liquid crystal display device when viewed from the observer's side. Like parts are identified by the same reference numerals in FIG. 9, and their description is omitted. Also, although not shown in the figure, the liquid crystal display device in FIG. 12 has a backlight unit, similar to that in FIG. 9, below a liquid crystal cell 81a.

In this liquid crystal display device, in order to optimize the brightness and contrast in a transmission mode while maintaining the necessary reflected luminance in a reflection mode, the areas and shapes of the apertures 74b are set so that the transmittance of the overall liquid crystal panel formed by a polarizer, an optical film, and a liquid crystal cell is normally about 1% to 4%.

However, improved characteristics are required for known transflective liquid-crystal display devices including various types of reflector.

For example, since the device including the transflector 75 using the high-reflectivity film 74 as mentioned in the foregoing a) utilizes the transflectivity of the high-reflectivity film 74, in a transmission mode, illuminating light passing through the high-reflectivity film 74 causes its color to change, and, in a reflection mode, the spectral reflectivity of the high-reflectivity film 74 causes the reflected luminance to deteriorate as a whole or the color to change. In addition, since the transmittance of the high-reflectivity film 74 is required to be strictly controlled (for example, the transmittance of the metal thin film itself is required to be 15% (±5% or less) to 25% (±5% or less) in the visible light region so as to maintain the display characteristics required for a display component), it is difficult to fabricate the high-reflectivity films 74, controlled as described above, in a well reproducible manner on a mass-production basis.

In addition, when used as a portable information terminal such as a portable phone, the known liquid crystal display device serving as a display component is often observed from a particular direction and is also required to an ambient-light collecting ability in the viewing direction. However, since the conventional transflectors of any type described above have reflected luminance characteristic whose curve is approximately symmetrical with those observed from a direction from which the observer does not view (a direction opposite to the viewing direction of the observer), it is difficult to improve the reflected luminance at the observer's side with respect to the normal of the liquid crystal display device, thereby resulting in dark display in the viewing side of the observer.

Furthermore, in known transflective liquid-crystal display devices, when the retardation ($\Delta$nd: where $\Delta$n and d are anisotropy of refractive index and the lay thickness of liquid crystal, respectively) of the liquid crystal cell is set to be equal to 740 nm or greater, for example, at a measuring wavelength of 589 nm, the characteristic is excellent in a transmission mode; however, in a reflective mode, the effective optical depth of the liquid crystal cell increases since incident light passes through the liquid crystal cell twice, thereby causing its display to be dark. Also, in this case, since the anisotropy of refractive index of the liquid crystal in use becomes large, its chromatic dispersion (wavelength dependency) inevitably becomes large, thereby leading to problems in that its color tends to change when the viewing angle changes and thus its color reproducibility deteriorates.

Moreover, although the optical films and polarizers are disposed above and below the liquid crystal cell so as to have optical axes (in general, absorption axes for the polarizers and slow axes for the retardation films) at respective predetermined angles, it is difficult to obtain a bright display having good color reproducibility in both the reflective and transmissive modes.

Although various transflective liquid-crystal display devices have been proposed in order to solve the above described problems, a transflective liquid-crystal display device which, in a reflective mode, offers a bright display especially over the viewing angle range of an observer, and good color reproducibility, and which, in a transmissive mode, also offers a bright display and good color reproducibility has not been achieved.

SUMMARY OF THE INVENTION

The present invention has been made to solve the foregoing problems. Accordingly, it is an object of the present invention to provide an STN-type transflective liquid-crystal display device which, in a reflective mode, offers a bright display, especially in the viewing angle range of an observer, and good color reproducibility, and which, in a transmissive mode, offers display being also bright and having good color reproducibility.

Also, it is another object of the present invention to provide an STN-type transflective liquid-crystal display device, performing a duty of about 1/200 (corresponding to matrix driving with 200 scanning lines), which, in a reflective mode, offers a bright display, especially in the viewing angle range of an observer, and having good color reproducibility, and which, in a transmissive mode, also offers a bright display and color reproducibility.

To achieve to the above objects, the transflective liquid-crystal display device according to the present invention has a structure which will be described below.

A transflective liquid-crystal display device according to the present invention comprises a liquid crystal cell, the liquid crystal cell comprising: a liquid crystal layer; a pair of mutually opposing transparent substrates sandwiching the liquid crystal layer; transparent electrodes and an alignment film formed close to the inner surface of one of the transparent substrates in that order; other transparent electrodes and another alignment film formed close to the inner surface of the other transparent substrate in that order; and a transflector disposed close to the one transparent substrate. The transflective liquid-crystal display device further comprises a first optical compensating plate and a first polarizer formed close to the outer surface of the other transparent substrate in that order; a second optical compensating plate and a second polarizer formed close to the outer surface of the one transparent substrate in that order; and an illuminator which is disposed close to the outer surface of the second polarizer formed close to the outer surface of the one transparent substrate and which emits illuminating light toward the liquid crystal cell.

The liquid crystal layer comprises a liquid crystal composition which has a positive dielectric anisotropy, which is twisted by about 220 to 260 degrees, and which is sandwiched by the pair of transparent substrates.

Also, the transflector comprises a high-reflectivity film having a plurality of fine apertures therein and the high-reflectivity film comprises a diffuse reflection surface, on the surface thereof, whose reflected luminance characteristic is controlled.

The transflector comprising the high-reflectivity film having the reflected luminance characteristic controlled as described above is disposed close to the inner surface of the one transparent substrate, the transflector or a film-like transflector comprising the high-reflectivity film formed on the upper surface of a base member or a resin film having concavities and convexities on the upper surface thereof may be laminated close to the inner surface of the one transparent substrate.

When the transflector comprising the high-reflectivity film having the reflected luminance characteristic controlled as described above is disposed close to the outer surface of the one transparent substrate, the transflector or the film-like transflector comprising the high-reflectivity film formed on the upper surface of the base member or the resin film having concavities and convexities on the upper surface thereof may be laminated close to the outer surface of the one transparent substrate.

The diffuse reflection surface of the high-reflectivity film is controlled, for example, for its reflected luminance characteristic not to exhibit a typical approximate Gaussian distribution (that is, its reflected luminance characteristic does not necessarily exhibit an approximate symmetric distribution with respect to the acceptance angle of its specular reflecting direction) or so as to have a distribution deviated from the typical approximate Gaussian distribution. More particularly, the diffuse reflection surface of the high-reflectivity film is controlled such that its reflected luminance characteristic exhibits a distribution having a substantially flat portion in its high reflected luminance region, preferably over a majority or substantially the entirety of the high reflected luminance region. One definition of the high reflected luminance region is the region of reflectance in which the reflectance of the impinging light is about 90% or greater of the maximum reflectance. An alternate definition is the region in which the contrast of the device is about 90% or greater of the maximum contrast.

According to the present invention, in the liquid crystal display device having a structure in which the foregoing liquid crystal layer includes the liquid crystal composition which has a positive dielectric anisotropy and which is sandwiched by the foregoing pair of transparent substrates while being twisted by 220 to 260 degrees, and the foregoing liquid crystal cell has respective optical compensating plates and polarizers thereon and thereunder, the foregoing transflector comprising the high-reflectivity film having a plurality of fine apertures is disposed close to the one transparent substrate of the liquid crystal cell and the high-reflectivity film is provided with the diffuse reflection surface, on the surface thereof, having the reflected luminance characteristic controlled so as not to exhibit an approximate symmetric distribution or so as to have a distribution deviated from the typical approximate Gaussian distribution, whereby, in a reflection mode, a reflection display having a high reflected luminance over a wide viewing angle is achieved and, in a transmissive mode, an excellent transmission display in which the transmittivity of transmitted light does not vary over a wide viewing angle is obtained.

Such advantages can be obtained in an STN-type transflective liquid-crystal display device performing a duty of about 1/200 (corresponding to matrix driving with 200 scanning lines).

In the transflective liquid-crystal display device according to the present invention, the liquid crystal cell may comprise a color filter layer close to the inner surface of either one of the pair of transparent substrates. With such a transflective liquid-crystal display device, in the reflection mode, a bright color display having especially good contrast in the observing angle range and good color reproducibility is obtained, and also, in the transmission mode, a bright color display having good contrast and good color reproducibility is obtained.

In the transflective liquid-crystal display device according to the present invention, the color filter layer is preferably formed on the high-reflectivity film of the transflector.

In the transflective liquid-crystal display device according to the present invention, the first optical compensating plate formed close to the outer surface of the other transparent substrate comprises first and second retardation films, and the second optical compensating plate formed close to the outer surface of the one transparent substrate comprises a third retardation film, the liquid crystal composition which is twisted by about 220° to 260° and whose transmitted luminance vs. voltage characteristic has a steepness index lying in the range from about 1.030 to 1.075 is used in the liquid crystal layer, and the liquid crystal cell has a birefringent retardation ($\Delta nd_{LC}$) lying in the range from about 690 to 735 nm (at a temperature of 25° C. and the measuring wavelength of 589 nm), when an alignment direction a of the alignment film close to the other transparent substrate and an alignment direction b of the alignment film close to the one transparent substrate are viewed from above, a reference direction X lies between the alignment directions a and b, passes through the intersection O of the alignment directions a and b, and also extends along a line bisecting the inner angle formed by the alignment directions a and b, the first retardation film has a birefringent retardation ($\Delta nd_{RF1}$) lying in the range from about 150 to 190 nm at a measuring wavelength of 546 nm, and also has a slow axis β which forms an angle ($\phi_{RF1}$) lying in the range from about 65 to 95 degrees with respect to the reference direction X in the counterclockwise direction when viewed from above, the second retardation film has a birefringent retardation ($\Delta nd_{RF2}$) lying in the range from about 350 to 400 nm at a measuring wavelength of 546 nm, and also has a slow axis γ which forms an angle ($\phi_{RF2}$) lying in the range from about 90 to 135 degrees with respect to the reference direction X in the counterclockwise direction when viewed from above, the first polarizer has an absorption axis a which forms an angle ($\phi_{pol1}$) lying in the range from about 35 to 55 degrees with respect to the reference direction X in the counterclockwise direction when viewed from above, the third retardation film has a birefringent retardation ($\Delta nd_{RF3}$) lying in the range from about 115 to 135 nm at a measuring wavelength of 546 nm, and also has a slow axis δ which forms an angle ($\phi_{RF3}$) lying in the range from about 55 to 85 degrees with respect to the reference direction X in the counterclockwise direction when viewed from above, the second polarizer has an absorption axis ε which forms an angle ($\phi_{pol2}$) lying in the range from about 10 to 40 degrees with respect to the reference direction X in the counterclockwise direction when viewed from above, and an angle formed by the slow axis δ of the third retardation film and the absorption axis ε of the second polarizer is set in the range from about 30 to 50 degrees.

In the transflective liquid-crystal display device, by setting the optical conditions of the liquid crystal layer, the liquid crystal cell, the first to third retardation films, and the first and second polarizers in the ranges according to the present invention, a bright display having especially good contrast in the observing angle range and good color reproducibility is obtained in the reflection mode, and also a bright display having good contrast and good color reproducibility is obtained in the transmission mode.

In the transflective liquid-crystal display device according to the present invention, the steepness index $\lambda$ (=$V_{90}/V_{10}$) of the liquid crystal preferably lies in the range from about 1.030 to 1.060 when driven by a typical passive-matrix voltage averaging method (so-called APT drive method).

In the transflective liquid-crystal display device according to the present invention, the steepness index preferably lies in the range from about 1.040 to 1.075 when driven by another drive method such as a multi-line addressing method (MLA drive method).

In the transflective liquid-crystal display device according to the present invention, the liquid crystal composition used in the liquid crystal layer is preferably twisted by about 240 to 250 degrees.

When set in these ranges, preferable results are obtained.

In the transflective liquid-crystal display device according to the present invention, the birefringent retardation ($\Delta nd_{LC}$) of the liquid crystal cell preferably lies in the range from about 700 to 730 nm (at a temperature of 25° C. and the measuring wavelength of 589 nm), and more preferably in the range from about 710 to 725 nm.

In the transflective liquid-crystal display device according to the present invention, the angle ($\phi_{pol1}$) formed by the absorption axis α of the first polarizer with respect to the reference direction X preferably lies in the range from about 40 to 50 degrees in the counterclockwise direction when viewed from above (the observer's side).

In the transflective liquid-crystal display device according to the present invention, the birefringent retardation ($\Delta nd_{RF1}$) of the first retardation film preferably lies in the range from about 155 to 185 nm at a measuring wavelength of 546 nm, and more preferably in the range from about 165 to 175 nm, and also the angle ($\phi_{RF1}$) formed by the slow axis β of the first retardation film with respect to the reference direction X lies in the range from about 70 to 90 degrees in the counterclockwise direction when viewed from above (the observer's side), and more preferably in the range from about 76 to 80 degrees.

In the transflective liquid-crystal display device according to the present invention, the birefringent retardation ($\Delta nd_{RF2}$) of the second retardation film preferably lies in the range from about 360 to 400 nm at a measuring wavelength of 546 nm, and more preferably in the range from about 370 to 380 nm, and also the angle ($\phi_{RF2}$) formed by the slow axis γ of the second retardation film with respect to the reference direction X preferably lies in the range from about 100 to 130 degrees in the counterclockwise direction when viewed from above (the observer's side), and more preferably in the range from about 110 to 120 degrees.

In the transflective liquid-crystal display device according to the present invention, the birefringent retardation ($\Delta nd_{RF3}$) of the third retardation film preferably lies in the range from about 120 to 130 nm at a measuring wavelength of 546 nm, and more preferably at about 125 nm.

In the transflective liquid-crystal display device according to the present invention, the angle ($\phi_{pol2}$) formed by the absorption axis ε of the second polarizer with respect to the reference direction X preferably lies in the range from about 20 to 30 degrees in the counterclockwise direction when viewed from above (the observer's side).

In the transflective liquid-crystal display device according to the present invention, when the alignment direction a of the alignment film close to the other transparent substrate and the alignment direction b of the alignment film close to the one transparent substrate are viewed from above (the observer's side), the reference direction X is related to an angle formed by the foregoing alignment directions a and b. For example, when the viewing direction of the liquid crystal cell is toward the proximal side (in the direction of six o'clock on the clock dial) and also the liquid crystal composition twisted in a left spiral manner is chosen, the reference direction X corresponds close to the direction of about three o'clock on the clock dial which lies close to the rubbing-alignment process direction of the one transparent substrate (the lower transparent substrate), and when the viewing direction of the liquid crystal cell is toward the far side (in the direction of twelve o'clock on the clock dial), the reference direction X corresponds close to the direction of about nine o'clock on the clock dial which lies close to the rubbing-alignment process direction of the other transparent substrate (the upper transparent substrate).

In the transflective liquid-crystal display device according to the present invention, the optical conditions of the first to third retardation films and the first and second polarizers, that is, the relationships among the absorption axes of the first and second polarizers, the slow axes of the first to third retardation films, and so forth, can be modified as needed. In particular, since the arrangements of the absorption axes of the polarizers most dominantly affect the display characteristics of the liquid crystal display device, for example, when the absorption axis of the first polarizer close to the observer's side is turned clockwise (or counterclockwise), the slow axis of the third retardation film and the absorption axis of the second polarizer, both being laminated on the under surface of the liquid crystal cell, are also modified so as to be turned clockwise (or counterclockwise) in correspondence to the above arrangements. In this case, by modifying the above arrangements, while substantially maintaining the angular relationship between an upper optical film, including the first polarizer, the first and second retardation films, and so forth, and a lower optical film including the second polarizer, the third retardation film, and so forth, good results can be obtained.

The first or second polarizer used in the present invention is selected, as needed, from high-contrast polarizers respectively having a non-glare process and an antireflection process applied on the corresponding surfaces thereof. The first and second retardation films used in the present invention are selected, as needed, from films which are obtained by drawing polymer films such as polycarbonate, polyarylate, and the like by controlling the drawing in a single axis. Also, a so-called Z-type retardation film whose refractive index is controlled in its thickness direction can be used (its Z-coefficient lying in the range from about about 0.2 to 0.6). These retardation films have an advantage in improving viewing angle characteristics.

By disposing the transflector comprising the high-reflectivity film including the diffuse reflection surface on the upper surface thereof, whose reflected luminance characteristic is controlled, in the liquid crystal cell, the transflective liquid-crystal display device according to the present invention offers a reflection display having a high reflected luminance at an observing angle varying in the range from about 5 to 45 degrees (about 5 to 45 degrees from the normal) in the reflection mode, and also offers an excellent transmission display in which the transmittivity of transmitted light does not vary over a predetermined angle range in the transmission mode.

The diffuse reflection surface of the transflector having the foregoing characteristics does not have a reflected luminance vs. acceptance angle characteristic which exhibits a conventional approximately symmetric curve (approximate Gaussian distribution, curve (7) shown in FIG. 13) with respect to the acceptance angle of the specular reflecting direction, but instead exhibits a curve (curve (3) shown in FIG. 13) having a substantially flat portion in its high reflected luminance with respect to an acceptance angle.

The transflector including the diffuse reflection surface having the foregoing characteristic is achieved, for example, by forming the high-reflectivity film on the base member having a plurality of fine concavities or convexities on the upper surface thereof, forming a plurality of fine concavities or convexities on the upper surface of the high-reflectivity film, i.e., on the diffuse reflection surface, and, as shown in FIG. 16, forming the sectional shape of the diffuse reflection surface 36c so as to have curved surfaces whose slopes are discontinuous and also forming a plurality of fine concave surfaces or fine convex surfaces without substantially leaving spaces. Also, the diffuse reflection surface having the foregoing characteristic is achieved such that each fine concave surface 36a or convex surface is formed so as to have an asymmetrical sectional shape and joining portions (boundaries) 36d between the adjacent concave surfaces 36a are processed by a method such as lithography, beam processing, or mechanical pressing so as not to have dull peaks.

FIG. 16 illustrates an example of the diffuse reflection surface 36c in which the plurality of fine concave surfaces (fine concavities) 36a are formed without substantially leaving spaces. The fine apertures formed in the high-reflectivity film are not shown in FIG. 16.

It is known that an acceptance angle range in which a high level of reflected luminance is achieved is about twice the tilt angle of the fine concave surface (or fine convex surface).

On the other hand, in a known transflector having a reflected luminance vs. acceptance angle characteristic exhibiting an approximate Gaussian distribution (a curve (7) shown in FIG. 13), concavities and convexities 74c are formed on the upper surface of a metal film 74a, as shown in FIG. 15, and have a sectional shape exhibiting a continuous curve having continuous slopes, that is, joining portions (boundaries) 74d between the adjacent concavities have curved surfaces. Apertures formed in the metal films are not shown in FIG. 15.

FIG. 13 shows the relationship between the reflected luminance and an acceptance angle obtained such that, when the upper surface of the transflector 75 is irradiated with incident light (external light) $L_1$ at an incident angle $\theta_1$ (an angle from the normal H), a photo detector 105 detects reflected light $R_1$, which is part of the incident light $L_1$ reflected at the foregoing surface, at an acceptance angle $\theta_a$ from the normal H (0°), and the reflected luminance is measured by varying the acceptance angle $\theta_a$ from the normal H (0°) to, for example, 60° while the angle $\theta_1$, which indicates the specular reflecting direction with respect to the surface of the transflector, is set as a center angle.

The base member used in the transflector according to the present invention may be controlled so as to have a surface structure having an asymmetrical sectional shape with respect to the normal of the substrate. With this arrangement, the high-reflectivity film formed on the base member can be controlled so as to have a high reflected luminance only over a desired observing angle range. The surface structures of the base member and the high-reflectivity film are preferably formed so as to have the concavities or convexities without substantially leaving spaces.

The transflector having the above described structure can be formed, selectively as needed, by photolithography and using a metal film provided with electrolytic plating, by using an energy beam whose power is controllable, by using a mechanical method for forming desired shapes, or the like.

The foregoing high-reflectivity film is preferably made from an Al-based or Ag-based metal film. Alternatively, it may be made from, for example, an Al-Nd-based metal film.

The aperture ratio of each fine aperture in the foregoing high-reflectivity film preferably lies in the range from about 15% to 35% with respect to the area of one pixel pitch of the liquid crystal cell.

The high-reflectivity film of the transflective liquid-crystal display device preferably has a reflected luminance characteristic in which the diffuse reflection surface has a high reflected luminance region with a substantially flat portion.

The diffuse reflection surface may have curved surfaces with slopes that are discontinuous between adjacent curved surfaces and that have substantially no space between the adjacent curved surfaces. Preferably, each curved surface also has an asymmetrical sectional shape.

In another embodiment of the invention, a method of fabricating a transflective liquid-crystal display device comprises introducing a liquid crystal layer between a first and a second transparent substrate and limiting the liquid crystal layer to having a liquid crystal composition of a positive dielectric anisotropy and which is twisted by about 220 to 260 degrees. The method also comprises forming a transflector on an inner surface of the first transparent substrate, forming a plurality of fine apertures in a high-reflectivity film of the transflector thereby forming a diffuse reflection surface on the transflector, controlling a reflected luminance characteristic of the diffuse reflection surface such that the diffuse reflection surface has a high reflected luminance region with a substantially flat portion, and planarizing the transflector by covering the fine apertures with a planarizing film. Additionally, the method also comprises forming a first set of transparent electrodes and a first alignment film on an inner surface of the transflector, a first optical compensating plate and a first polarizer on an outer surface of the first transparent substrate, a second set of transparent electrodes and a second alignment film on an inner surface of the second transparent substrate, and a second optical compensating plate and a second polarizer on an outer surface of the second transparent substrate and placing a backlight proximate to an outer surface of the second polarizer.

The method may also comprise forming a color filter layer proximate to the inner surface of either of first and second transparent substrates and more preferably comprise forming the color filter layer on the high-reflectivity film of the transflector prior to planarizing the transflector.

The method preferably comprises incorporating first and second retardation films in the first optical compensating plate and incorporating a third retardation film in the second optical compensating plate; limiting a steepness index of a transmitted luminance vs. voltage characteristic of the liquid crystal composition of the liquid crystal layer to about 1.030 to 1.075 and limiting a birefringent retardation ($\Delta nd_{LC}$) from about 690 to 735 nm at a measuring wavelength of 589 nm; limiting a first alignment direction a of the first alignment film and a second alignment direction b of the second alignment film such that as viewed from above, a reference direction X lies between the alignment directions a and b, passes through an intersection O of the alignment directions a and b, and also extends along a line bisecting an inner angle formed by the alignment directions a and b; limiting a birefringent retardation ($\Delta nd_{RF1}$) of the first retardation film from about 150 to 190 nm at a measuring wavelength of 546 nm, and a slow axis β which forms an angle ($\phi_{RF1}$) from about 65 to 95 degrees with respect to the reference direction X in a counterclockwise direction when viewed from above; limiting a birefringent retardation ($\Delta nd_{RF2}$) of the second retardation film from about 350 to 400 nm at a measuring wavelength of 546 nm, and a slow axis γ which forms an angle ($\phi_{RF2}$) from about 90 to 135 degrees with respect to the reference direction X in the counterclockwise direction when viewed from above; limiting an absorption axis α of the first polarizer which forms an angle ($\phi_{pol1}$) from about 35 to 55 degrees with respect to the reference direction X in the counterclockwise direction when viewed from above; limiting a birefringent retardation ($\Delta nd_{RF3}$) of the third retardation film from about 115 to 135 nm at a measuring wavelength of 546 nm and a slow axis δ which forms an angle ($\phi_{RF3}$) from about 55 to 85 degrees with respect to the reference direction X in the counterclockwise direction when viewed from above; limiting an absorption axis ε of the second polarizer which forms an angle ($\phi_{pol2}$) from about 10 to 40 degrees with respect to the reference direction X in the counterclockwise direction when viewed from above; and limiting an angle formed by the slow axis δ of the third retardation film and the absorption axis ε of the second polarizer from about 30 to 50 degrees.

The method may also comprise limiting the birefringent retardation ($\Delta nd_{LC}$) of the liquid crystal cell from about 700 to 730 nm at a measuring wavelength of 589 nm, limiting the angle ($\phi_{pol1}$) formed by the absorption axis α of the first polarizer with respect to the reference direction X from about 40 to 50 degrees in the counterclockwise direction when viewed from above, limiting the birefringent retardation ($\Delta nd_{RF1}$) of the first retardation film from about 155 to 185 nm at a measuring wavelength of 546 nm, and the angle ($\phi_{RF1}$) formed by the slow axis β of the first retardation film with respect to the reference direction X from about 70 to 90 degrees in the counterclockwise direction when viewed from above, or limiting the birefringent retardation ($\Delta nd_{RF2}$) of the second retardation film from about 360 to 400 nm at a measuring wavelength of 546 nm, and the angle ($\phi_{RF2}$) formed by the slow axis γ of the second retardation film with respect to the reference direction X from about 100 to 130 degrees in the counterclockwise direction when viewed from above.

The method may also comprise limiting an aperture ratio of each fine aperture from about 15% to 35% with respect to an area of one pixel pitch of the liquid crystal cell.

The method may also comprise driving the liquid crystal by a voltage averaging method and limiting the steepness index of the transmitted luminance vs. voltage characteristic of the liquid crystal composition of the liquid crystal layer from about 1.030 to 1.060 when driven by the voltage averaging method, driving the liquid crystal by a multi-line addressing method and limiting the steepness index of the transmitted luminance vs. voltage characteristic of the liquid crystal composition of the liquid crystal layer from about 1.040 to 1.075 when driven by the multi-line addressing method, or in general limiting a steepness index of a transmitted luminance vs. voltage characteristic of the liquid crystal composition of the liquid crystal layer to different ranges dependent on the method used to drive the liquid crystal layer.

The method may also comprise forming the high-reflectivity film such that the diffuse reflection surface has a high reflected luminance region with a substantially flat portion or forming the diffuse reflection surface to have curved surfaces with slopes that are discontinuous between adjacent curved surfaces and such that substantially no space exists between the adjacent curved surfaces. In the latter case, preferably the diffuse reflection surface is formed such that each curved surface has an asymmetrical sectional shape.

DESCRIPTION OF THE PREFERRED EMBODIMENT

A preferred embodiment of the present invention will be described with reference to the attached drawings.

Figure 1:
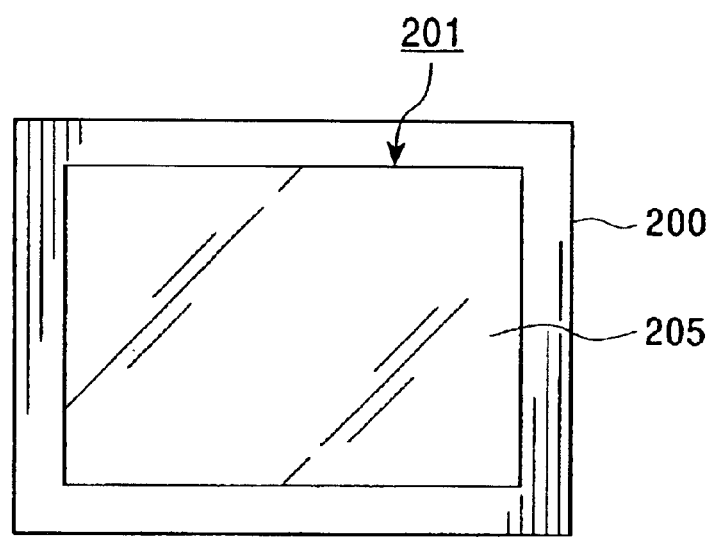
FIG. 1 is a front view illustrating a display portion of a portable information terminal including a transflective liquid-crystal display device according to an embodiment of the present invention.

FIG. 1 is a front view illustrating an example display portion of a portable information terminal including an STN-type transflective liquid-crystal display device, performing a duty of about 1/200 (corresponding to matrix driving with 200 scanning lines), which is one application of a transflective liquid-crystal display device according to an embodiment of the present invention.

The display portion of the portable information terminal has at least a frame 200 and a transflective liquid-crystal display device 201, according to the embodiment, installed in the frame 200.

Figure 2:
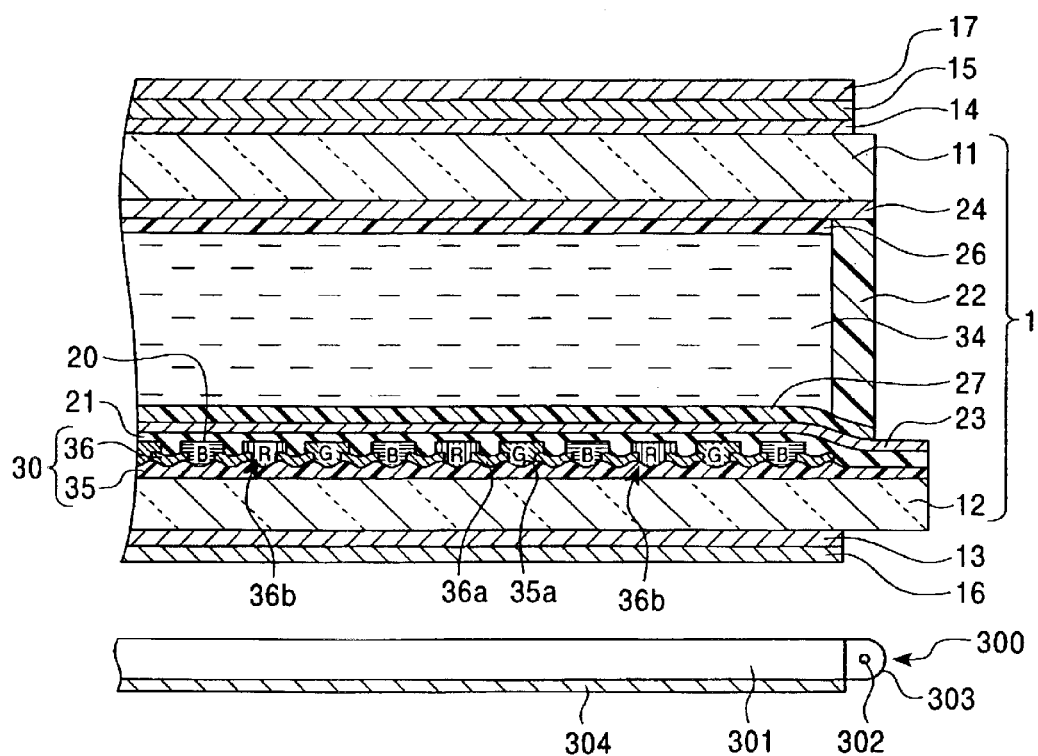
FIG. 2 is a sectional view illustrating the structure of the transflective liquid-crystal display device of an STN-type according the embodiment of the present invention.

As shown in FIG. 2, the transflective liquid-crystal display device 201 according to the embodiment includes a liquid crystal cell 1 including a lower glass substrate (one transparent substrate) 12 and an upper glass substrate (the other transparent substrate) 11, a first retardation film (a retardation film adjacent to the other transparent substrate) 14, a second retardation film (a retardation film adjacent to a first polarizer 17) 15, and the first polarizer 17 which are disposed on the outer surface of the upper glass substrate 11 in that order. The transflective liquid-crystal display device 201 also has a third retardation film 13 (a second optical compensating plate) and a second polarizer 16, which are disposed on the outer surface of the lower glass substrate 12. The first and second retardation films 14 and 15 form an upper optical compensating plate (a first optical compensating plate). Also, the second polarizer 16 has a backlight unit 300 disposed therebelow.

The foregoing liquid crystal cell 1 includes a liquid crystal layer 34, the mutually opposing upper and lower glass substrates 11 and 12 sandwiching the liquid crystal layer 34 therebetween, a transflector 30, a color filter layer 20 having a coloring layer, a planarizing film 21, transparent electrodes 23, and a lower alignment film (an alignment film close to the one transparent substrate) 27 which are disposed on the inner surface of the lower glass substrate 12 in that order. The transflective liquid-crystal display device 201 also has transparent electrodes 24, a top coating (not shown), and an upper alignment film (an alignment film close to the other transparent substrate) 26 which are disposed on the inner surface of the upper glass substrate 11 in that order.

The transflective liquid-crystal display device 201 having the above-described structure operates in a reflection mode in which the backlight unit 300 is not illuminated when enough external light is provided, and in a transmission mode in which the backlight unit 300 is illuminated when enough external light is not provided.

In the reflection mode, light incident on the first polarizer 17 is linearly polarized by the first polarizer 17, and the polarized light is elliptically polarized when passing through the first and second retardation films 14 and 15, and the liquid crystal layer 34. The elliptically polarized light is reflected at a high-reflectivity film 36 of the transflector 30, again passes through the liquid crystal layer 34 and the first and second retardation films 14 and 15, and is again linearly polarized by the first polarizer 17 before exiting therefrom.

In the transmission mode, light emitted from the backlight unit 300 is linearly polarized by the second polarizer 16, the polarized light is substantially circularly polarized by the third retardation film 13, and is then elliptically polarized when passing through the liquid crystal layer 34 and the first and second retardation films 14 and 15. Subsequently, the elliptically polarized light is linearly polarized when passing through the first polarizer 17 and exits from the first polarizer 17. The transflector 30 lying between the lower glass substrate 12 and the liquid crystal layer 34 has the high-reflectivity film 36, having a plurality of fine apertures 36b which will be described later, on the upper surface thereof so as to allow part of the light emitted from the backlight unit 300 to pass therethrough by being transmitted through the apertures 36b.

Accordingly, the transflective liquid-crystal display device 201 according to the embodiment has a structure in which light is transmitted through the third retardation film 13 (the lower optical compensating plate) and the second polarizer 16 only in the transmission mode.

The upper and lower alignment films 26 and 27 are commonly-used transparent alignment films formed, for example, by rubbing a polymer film such as polyimide.

Figure 3:
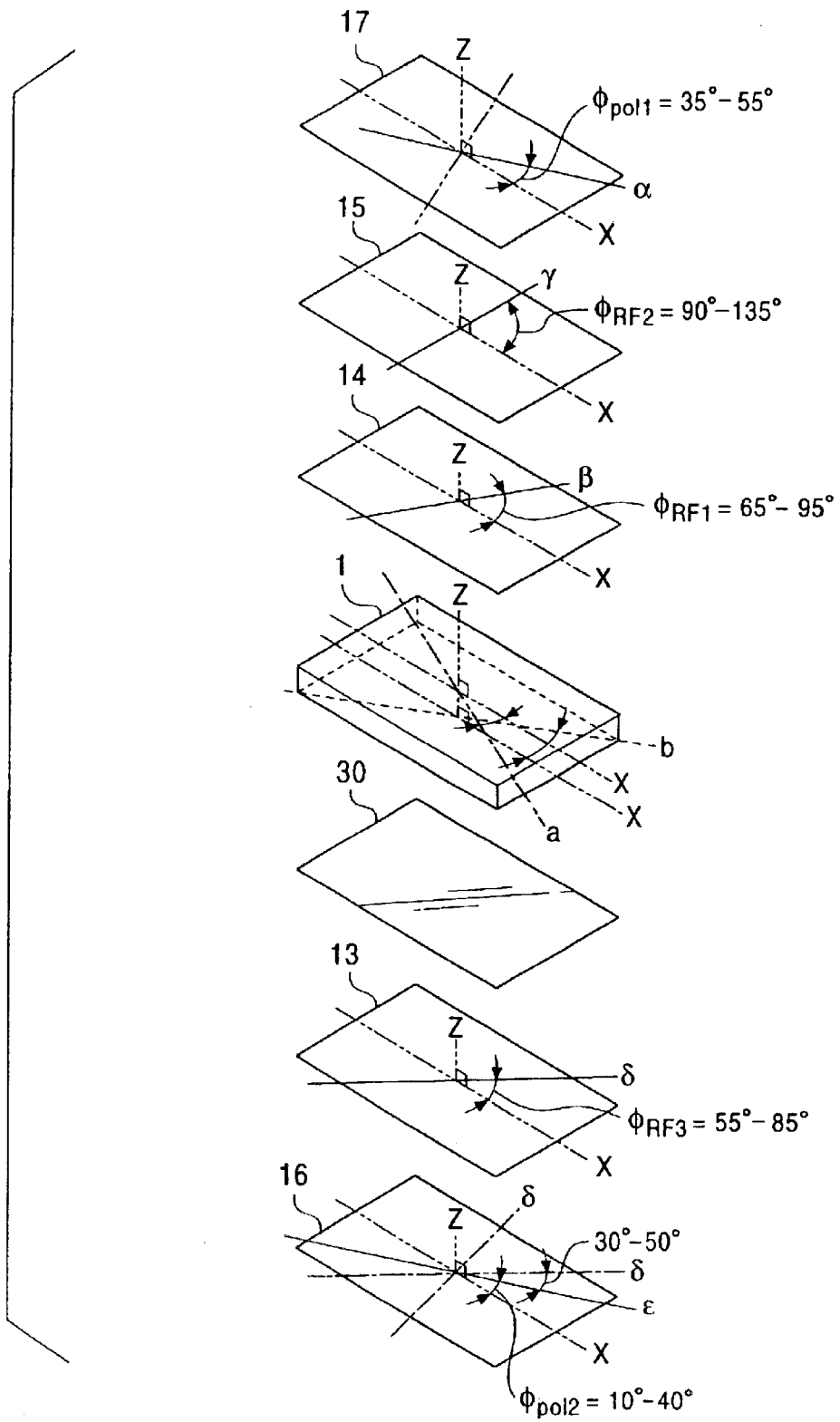
FIG. 3 is an exploded view illustrating the main part of the transflective liquid-crystal display device according to the embodiment of the present invention in order to achieve the optimal conditions necessary for high luminance.
Figure 4:
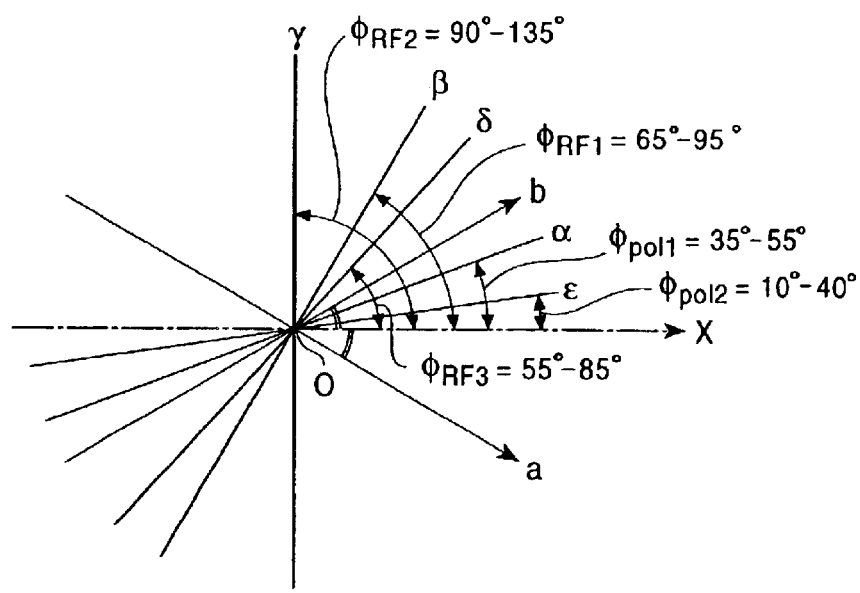
FIG. 4 is a plan view illustrating the arrangement relationships among the absorption axis α of a first polarizer, the slow axis β of a first retardation film, the slow axis γ of a second retardation film, the alignment direction a of an upper alignment film, the alignment direction b of a lower alignment film, the slow axis δ of a third retardation film, and the absorption axis ε of a second polarizer of the transflective liquid-crystal display device according to the embodiment of the present invention in order to achieve the optimal conditions necessary for high luminance.

When the alignment direction a of the upper alignment film 26 and the alignment direction b of the lower alignment film 27 are viewed from above (the observer's side), as shown in FIGS. 3 and 4, a reference direction X (a reference axis X) lies between the alignment directions a and b, passes through the intersection O of the alignment directions a and b, and also extends along a line bisecting the inner angle formed between the alignment directions a and b.

In FIGS. 3 and 4, a direction Z is orthogonal to the upper surfaces of the liquid crystal cell 1, the first, second, and third retardation films 14, 15, and 13, and the first and second polarizers 17 and 16.

The liquid crystal layer 34 is composed of a liquid crystal composition having a positive dielectric anisotropy and a spiral structure twisted by about 220 to 260 degrees, and preferably by about 240 to 250 degrees in its thickness direction. The liquid crystal composition includes liquid crystal molecules which exist in a nematic state at room temperature and are sealed in the area enclosed by the upper and lower alignment films 26 and 27, disposed on the corresponding inner surfaces of the upper and lower glass substrates 11 and 12, and by a sealant 22 bonding the upper and lower alignment films 26 and 27 forming a predetermined gap therebetween. The liquid crystal molecules are provided with spontaneous twistability for the super twisted nematic type. The liquid crystal molecules have a pre-tilt angle of, for example, about 4 to 5 degrees.

Figure 6:
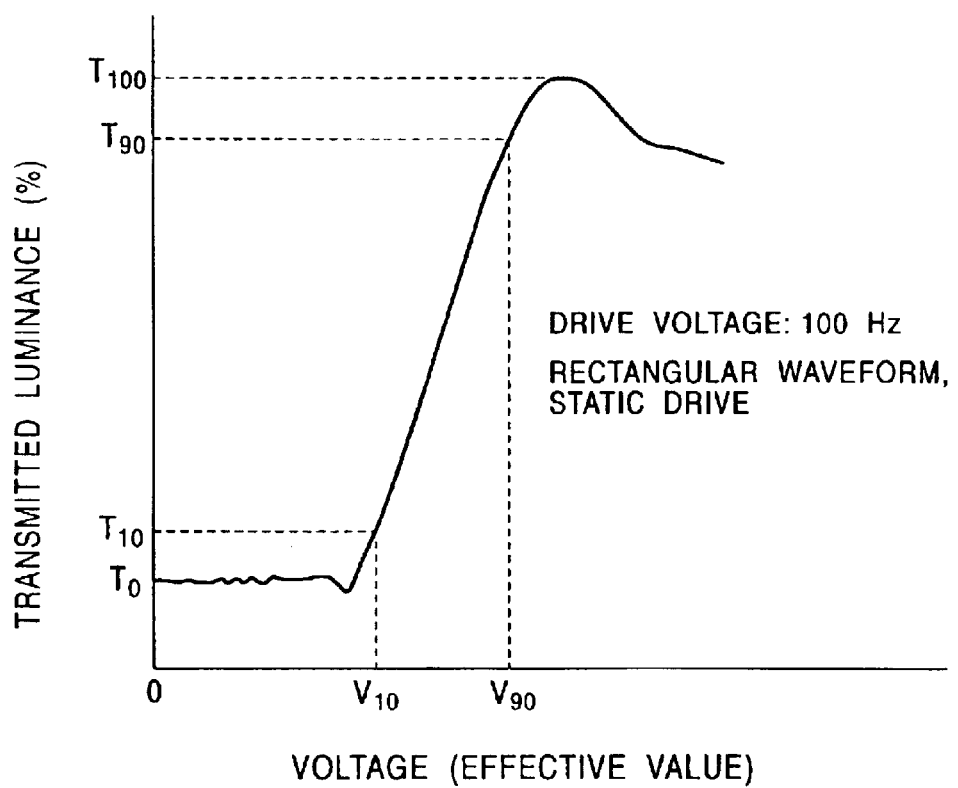
FIG. 6 illustrates a transmitted luminance vs. voltage characteristic.

Preferably, the liquid crystal composition has a transmitted luminance vs. voltage characteristic whose steepness index $\lambda$ ($\lambda = V_{90}/V_{10}$) lies in the range from about 1.030 to 1.060. The steepness index $\lambda$ is obtained from the transmitted luminance vs. voltage characteristic. FIG. 6 illustrates a transmitted luminance vs. voltage characteristic. By using a liquid crystal display device having the first and second polarizers 17 and 16 respectively disposed above and below the liquid crystal cell 1 (with no retardation film, a 240°-twisted liquid crystal layer, and yellow mode display), the transmitted luminance vs. voltage characteristic is obtained in a constant temperature (20° C.) atmosphere by emitting incident light at a predetermined incident angle (zero degree from the normal) from a light source disposed below the liquid crystal display device and then by applying a static drive voltage having a frequency of 100 Hz and a rectangular waveform between the transparent electrodes of the liquid crystal cell 1 when a photo detector disposed above the liquid crystal display device detects transmitted light component of the incident light at a predetermined acceptance angle $\theta_a$ (zero degree from the normal) When effective voltages causing transmitted luminance T to vary by 10% and 90% are defined as $V_{10}$ and $V_{90}$, respectively, the steepness index $\lambda$ is obtained by the ratio $V_{90}/V_{10}$. The steepness index $\lambda$ is a parameter representing the steepness of the optical characteristic due to changes in the electric field alignment of the liquid crystal. When the steepness index $\lambda$ is less than about 1.030, since the steepness of the liquid crystal display device is too large, slight variations in the cell gap or the alignment process causes problems such as the so-called stripe domains and a deteriorated response. Also, when the steepness index $\lambda$ exceeds about 1.060, the necessary steepness is not obtained, thereby resulting in failure to achieve a high-contrast display. Accordingly, by setting the steepness index $\lambda$ in the range from about 1.030 to 1.060, the liquid crystal display devices can be stably manufactured, in addition to achieving a high-contrast display.

The foregoing top coating is disposed so as to provide insulation and is composed of an inorganic material such as silica or $ZrO_2$.

The upper glass substrate (the other transparent substrate) 11 in the embodiment is composed of soda lime glass or the like. The thickness of the upper glass substrate 11 is in the range from about 0.3 to 1.1 mm, although this depends on the type of the liquid crystal display device.

The lower glass substrate (the one transparent substrate) 12 in the embodiment is composed of soda lime glass, including alkali oxide such as sodium oxide, or the like. Although the thickness of the lower glass substrate 12 is normally in the range from about 0.3 to 1.1 mm, it is also possible to fabricate a transflective liquid-crystal display component by making the lower glass substrate thin in particular so that its thickness lies in the range from about 0.1 to 0.3 mm, and by stacking a film-like transflector, composed of a resin film having concavities on the surface thereof so as to provide a high-reflectivity film, on the outer surface of the lower glass substrate.

Figure 5:
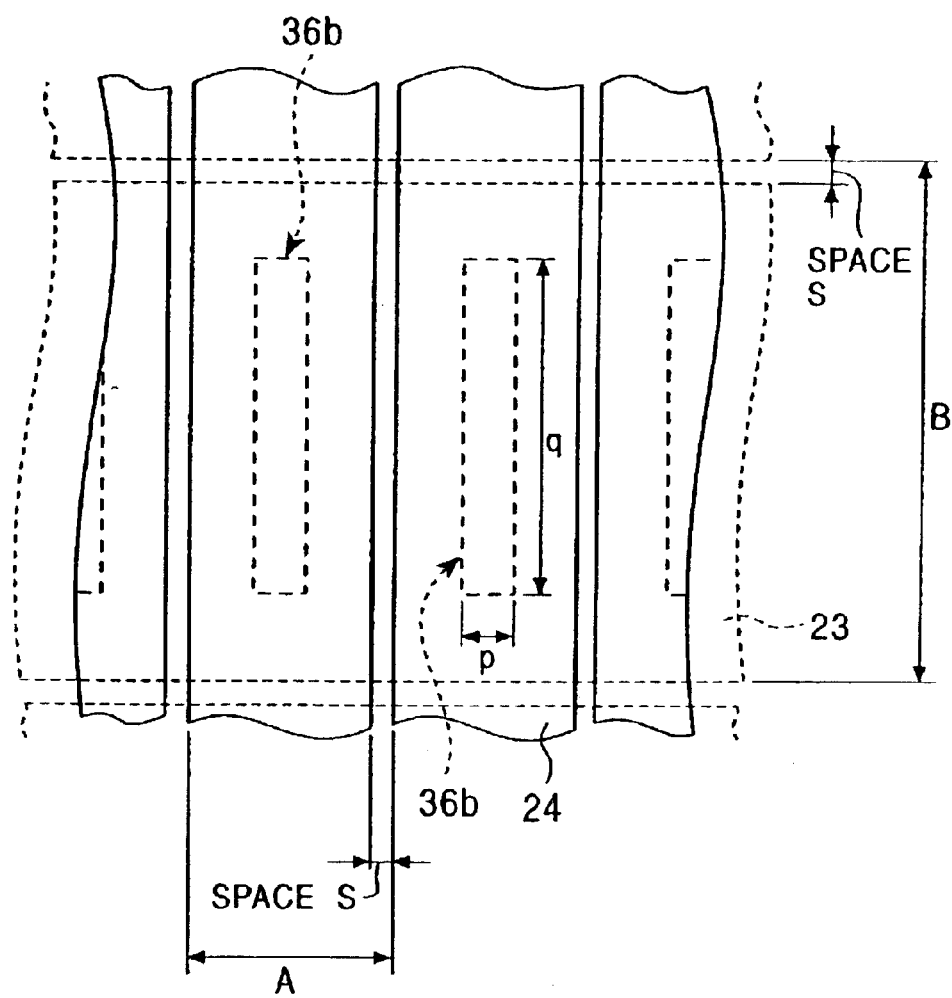
FIG. 5 is a plan view illustrating the positional relationship between a high-reflectivity film and upper and lower transparent electrodes when the transflective liquid-crystal display device according to the embodiment is viewed from the observer's side.
Figure 16:
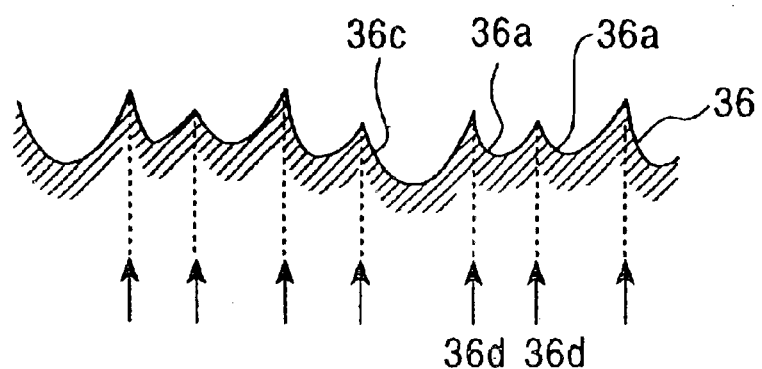
FIG. 16 is a magnified sectional view illustrating a high-reflectivity film of the transflector included in the transflective liquid-crystal display device according to the embodiment of the present invention.

FIG. 5 is a plan view illustrating the positional relationship between the high-reflectivity film and the upper and lower transparent electrodes when the transflective liquid-crystal display device according to the embodiment is viewed from the observer's side. FIG. 16 is a sectional view illustrating the high-reflectivity film of the transflector included in the transflective liquid-crystal display device according to the embodiment of the present invention.

As shown in FIGS. 2, 5, and 16, the transflector 30 has a base member 35, having a plurality of concavities 35a, and the high-reflectivity film 36, having a plurality of concave surfaces 36a corresponding to the respective concavities 35a, formed on the base member 35. The high-reflectivity film 36 has a large number of the fine apertures 36b formed therein.

The transflector 30 is disposed on the inner surface of the lower glass substrate 12 of the liquid crystal cell 1, wherein the base member 35, composed of a known organic material such as an acrylic-based or epoxy-based material, or a resin film having a thickness of several nanometers, is formed on the inner surface of the lower glass substrate 12, and the high-reflectivity film 36 is formed on either the base member 35 or the resin film so as to face the liquid crystal layer 34.

The base member 35 is disposed so as to effectively scatter reflected light by providing the high-reflectivity film 36, formed thereon, with concavities and convexities. By providing the high-reflectivity film 36 with concavities and convexities, light incident on the transflective liquid-crystal display device 201 can be effectively reflected, thereby achieving a bright display in the reflection mode.

The high-reflectivity film 36 is disposed on the base member 35 so as to achieve a bright display by reflecting and scattering light incident on the liquid crystal layer 34. The high-reflectivity film 36 is preferably composed of a metal material, having a high reflectance, such as Al, Ag, or Al—Nd, and is formed by depositing, such as sputtering or vacuum deposition, the metal material.

The thickness of the high-reflectivity film 36 is preferably in the range from about 800 to 2000 nm, and more preferably in the range from about 1000 to 2000 nm.

Preferably, the aperture ratio of each fine aperture 36b of the high-reflectivity film 36 lies in the range from about 15% to 35% relative to the area of one pixel pitch of the liquid crystal cell 1. As shown in FIG. 5, the aperture ratio of each aperture 36b is defined as the ratio of the area of the aperture 36b (width p×length q of the aperture) to that of one pitch pixel (width A×length B of one pixel).

The foregoing apertures 36b are formed in the high-reflectivity film 36 by, for example, lithography.

The high-reflectivity film 36 has the foregoing plurality of concave surfaces 36a, and thus has a diffuse reflection surface 36c, on the upper surface thereof, which is controlled so as to provide a reflected luminance characteristic in which the luminance has a substantially flat peak value. Examples of the reflected luminance characteristic of the high-reflectivity film 36 are curves (4) and (5), shown in FIG. 8, illustrating characteristics of liquid crystal display devices in Examples of the present invention, which will be described later, or a curve (3) shown in FIG. 13.

Figure 8:
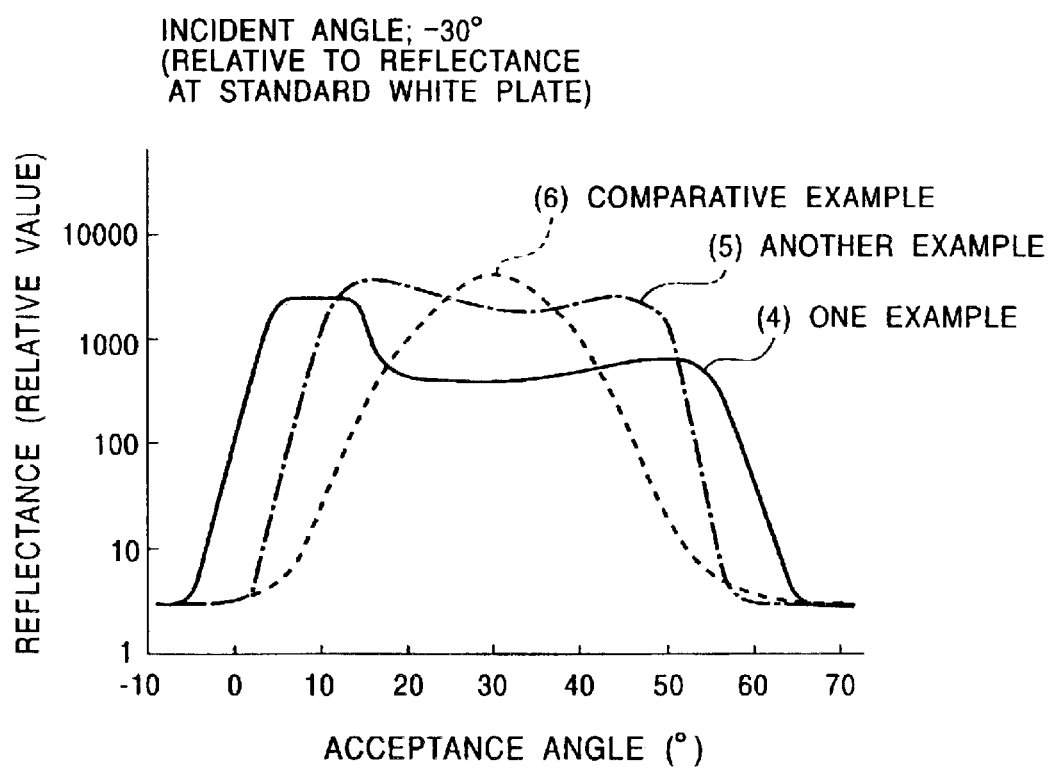
FIG. 8 illustrates reflected luminance characteristics in a reflection mode of Examples of the transflective liquid-crystal display device and that of a Comparative Example.
Figure 9:
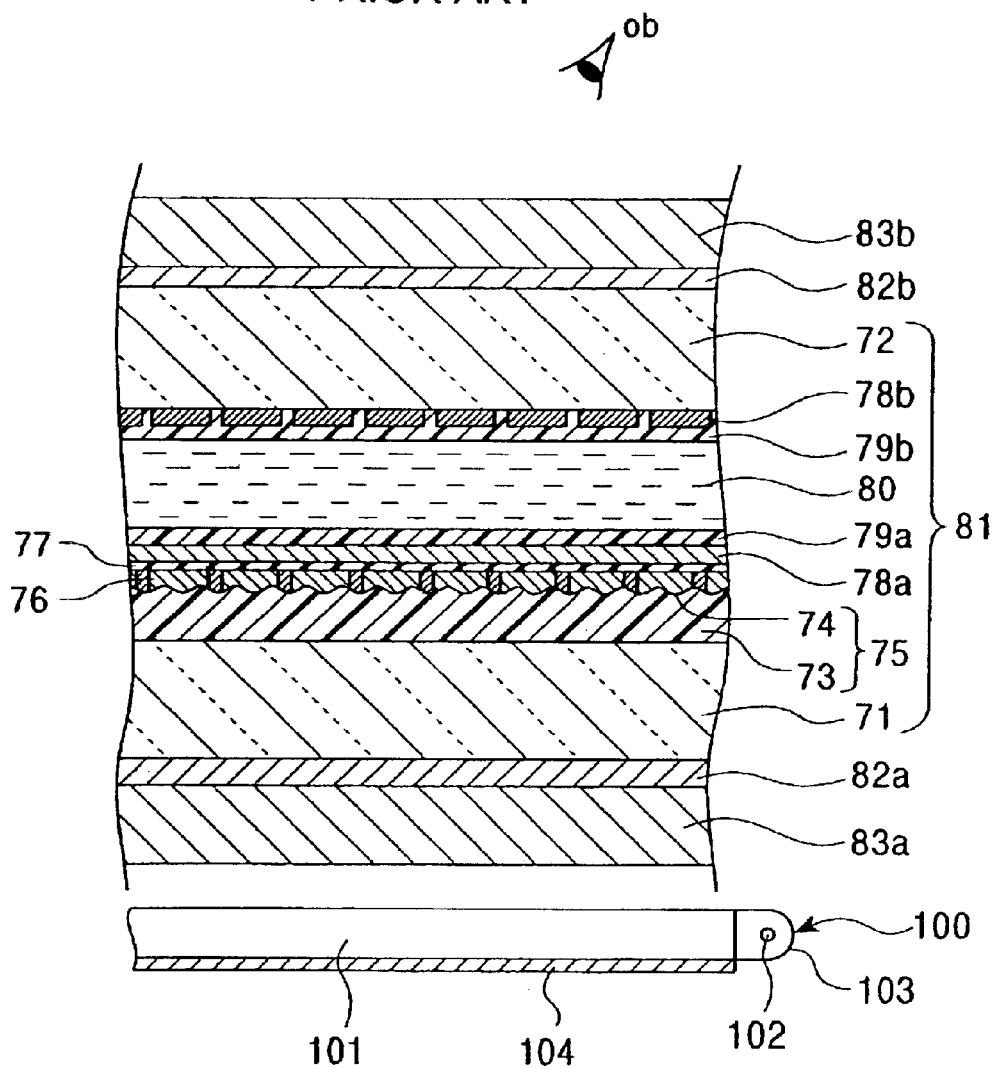
FIG. 9 illustrates a partial sectional structure of a known liquid crystal display device having a built-in transflector.
Figure 10:
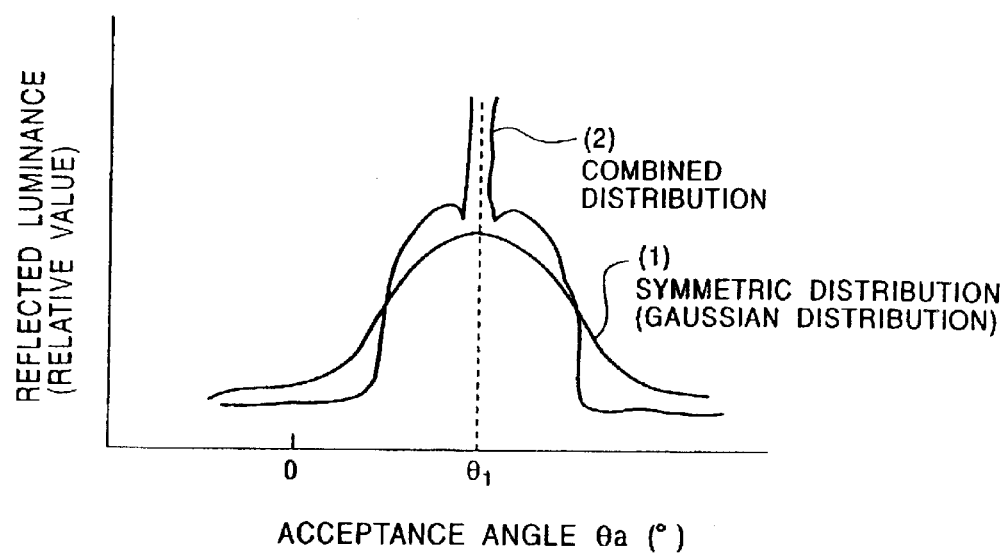
FIG. 10 illustrates reflected luminance characteristics of a diffuse-reflection transflector included in the known liquid crystal display device having a built-in transflector.
Figure 13:
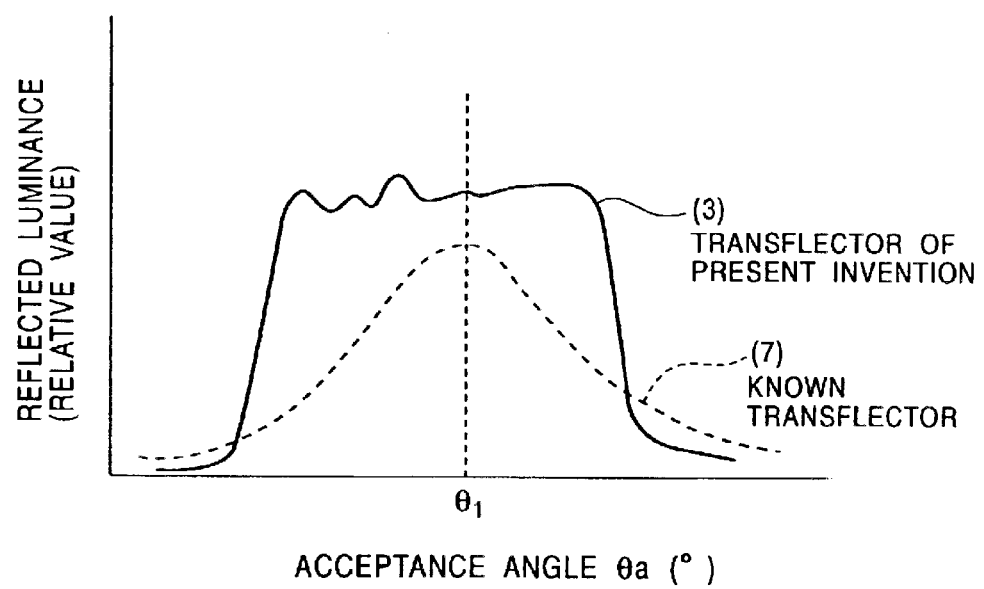
FIG. 13 illustrates reflected luminance characteristics of the known transflector and a transflector according to the present invention.
Figure 14:
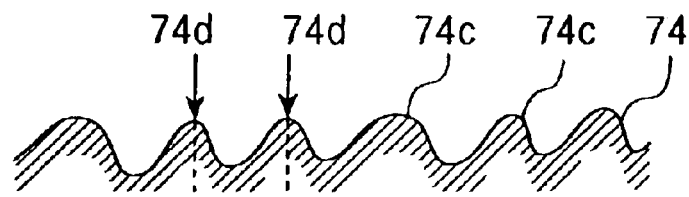
FIG. 14 is a magnified sectional view illustrating a metal film of the transflector included in the known transflective liquid-crystal display device shown in FIG. 9.
Figure 15:
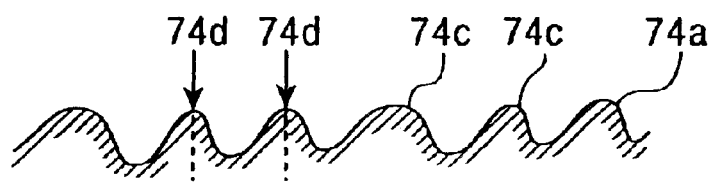
FIG. 15 is a magnified sectional view illustrating a metal film of the transflector included in the known transflective liquid-crystal display device shown in FIGS. 12A and 12B.

Instead of exhibiting either one of the known curves (7) in FIG. 13 and (6) in FIG. 14, each known curve having a substantially symmetrical shape (a substantially Gaussian distribution) which is substantially symmetric with respect to the angle of its specular reflecting direction, the reflected luminance vs. acceptance angle characteristic of the diffuse reflection surface, having the controlled reflected luminance characteristic, of the transflector is arranged so as to exhibit any one of curves (4) and (5) in FIG. 8 and (3) in FIG. 13, each curve having a substantially flat portion in its high reflected luminance region with respect to an acceptance angle. Then, a more visible display can be obtained.

The transflector including the diffuse reflection surface having the foregoing characteristics is achieved, for example, by forming the high-reflectivity film 36 on the base member 35 having a plurality of fine concavities or convexities on the upper surface thereof, forming a plurality of fine concavities or convexities on the upper surface of the high-reflectivity film 36, i.e., on the diffuse reflection surface 36c, and, as shown in FIG. 16, forming the sectional shape of the diffuse reflection surface 36c so as to have curved surfaces whose slopes are discontinuous and also forming a plurality of fine concave surfaces or fine convex surfaces without substantially leaving spaces.

Also, the diffuse reflection surface having the reflected luminance characteristics as represented by the curves (4) and (3) in FIGS. 8 and 13 is achieved such that each fine concave surface 36a or convex surface is formed so as to have an asymmetrical sectional shape and joining portions (boundaries) 36d between the adjacent concave surfaces 36a are processed by a method such as lithography, beam processing, or mechanical pressing so as not to have dull peaks. However, in the diffuse reflection surface having the reflected luminance characteristic as represented by the curve (5) in FIG. 8, each fine concave surface 36a or convex surface is not formed so as to have an asymmetrical sectional shape.

Since the foregoing transflector 30 is formed by the base member 35, having the concavities 35a formed on the upper surface thereof, and by the high-reflectivity film 36 having the concave surfaces 36a corresponding to the respective concavities 35a, it provides a high light-collection efficiency and an improved reflectance. With this structure, display brightness is improved in the reflection mode, thereby leading to excellent display characteristics.

Also, since each aperture 36b of the high-reflectivity film 36 is formed so as to lie in the range of the foregoing aperture ratio, the display brightness in the transmission mode is improved, thereby leading to excellent display characteristics.

The birefringent retardation ($\Delta nd_{LC}$) of the foregoing liquid crystal cell 1 is set to lie in the range from about 690 to 735 nm (at a temperature of 25° C. and a measuring wavelength of 589 nm). When the birefringent retardation $\Delta nd_{LC}$ lies outside the foregoing range, the display surface becomes dark or the anisotropy of refractive index of the liquid crystal in use becomes large, thereby causing problems of larger temperature dependency and the like.

Also, the foregoing $\Delta nd_{LC}$ lies preferably in the range from about 700 to 730 nm (at a temperature of 25° C. and a measuring wavelength of 589 nm) and more preferably in the range from about 710 to 725 nm.

The transflective liquid-crystal display device 201 according to this embodiment is constructed such that light passes through the third retardation film 13 and the second polarizer 16 only in the transmission mode, as described above. Accordingly, the first and second retardation films 14 and 15 and the first polarizer 17 are involved in the operation of the liquid crystal display device in both transmission and reflection modes; however, the third retardation film 13 and the second polarizer 16 are involved in the operation only in the transmission mode.

The first, second, and third retardation films 14, 15, and 13 are selected as needed from various films which are obtained by drawing polymer films such as polycarbonate and polyarylate by controlling the drawing in a single axis. Their drawing directions become slow axes. Also, a so-called Z-type retardation film whose refractive index is controlled in its thickness direction can be used (its Z-coefficient lying in the range from about 0.2 to 0.6). These retardation films have an advantage in that they improve the viewing angle characteristics.

The first retardation film 14 has a birefringent retardation ($\Delta nd_{RF1}$) lying in the range from about 150 to 190 nm at a measuring wavelength of 546 nm. When the birefringent retardation $\Delta nd_{RF1}$ lies outside the foregoing range, the birefringent retardation and the wavelength dependency of the liquid crystal display device cannot be compensated for.

The foregoing birefringent retardation $\Delta nd_{RF1}$ lies preferably in the range from about 155 to 185 nm and more preferably in the range from about 165 to 175 nm.

Also, as shown in FIGS. 3 and 4, the first retardation film 14 has a slow axis β which forms an angle ($\phi_{RF1}$) lying in the range from about 65 to 95 degrees with respect to the foregoing reference direction X in the counterclockwise direction when viewed from above (from the observer's side, that is, from the side opposite to the backlight unit 300). When the slow axis β is not set in the foregoing range, the liquid crystal display device has a lowered optical compensation effect and deteriorated viewing characteristics in the lateral direction or in the vertical direction. The angle $\phi_{RF1}$ lies preferably in the range from about 70 to 90 degrees in the counterclockwise direction when viewed from above and more preferably in the range from about 76 to 80 degrees.

The second retardation film 15 has a birefringent retardation ($\Delta nd_{RF2}$) lying in the range from about 350 to 400 nm at a measuring wavelength of 546 nm.

When the birefringent retardation $\Delta nd_{RF2}$ lies outside the foregoing range, the optical compensation effect of the liquid crystal display device is not obtained.

The foregoing birefringent retardation $\Delta nd_{RF2}$ lies preferably in the range from about 360 to 400 nm and more preferably in the range from about 370 to 380 nm.

As shown in FIGS. 3 and 4, the second retardation film 15 has a slow axis γ which forms an angle ($\phi_{RF2}$) in the range from about 90 to 135 degrees with respect to the foregoing reference direction X in the counterclockwise direction when viewed from above (from the observer's side, that is, from the side opposite to the backlight unit 300).

When the slow axis γ is not set in the foregoing range, the liquid crystal display device has a lowered optical compensation effect and deteriorated viewing characteristics.

The angle $\phi_{RF2}$ lies preferably in the range from about 100 to 130 degrees in the counterclockwise direction when viewed from above and more preferably in the range from about 110 to 120 degrees.

As shown in FIGS. 3 and 4, the first polarizer 17 has an absorption axis α which forms an angle ($\phi_{pol1}$) in the range from about 35 to 55 degrees with respect to the foregoing reference direction X in the counterclockwise direction when viewed from above (from the observer's side, that is, from the side opposite to the backlight unit 300).

When the absorption axis α is not set in the foregoing range, the liquid crystal display device has a lowered optical compensation effect and deteriorated viewing characteristics.

The angle $\phi_{pol1}$ lies preferably in the range from about 40 to 50 degrees in the counterclockwise direction when viewed from above.

The third retardation film 13 has a birefringent retardation ($\Delta nd_{RF3}$) lying in the range from about 115 to 135 nm at a measuring wavelength of 546 nm.

When the birefringent retardation $\Delta nd_{RF2}$ lies outside the foregoing range, polarization matching to the retardation of the liquid crystal display device is not achieved in the transmission mode, thereby resulting in unwanted colors or the like.

The foregoing birefringent retardation $\Delta nd_{RF3}$ lies preferably in the range from about 120 to 130 nm and more preferably at about 125 nm.

As shown in FIGS. 3 and 4, the third retardation film 13 has a slow axis δ which forms an angle ($\phi_{RF3}$) lying in the range from about 55 to 85 degrees with respect to the foregoing reference direction X in the counterclockwise direction when viewed from above (from the observer's side, that is, from the side opposite to the backlight unit 300).

When the birefringent retardation $\Delta nd_{RF3}$ lies outside the foregoing range, polarization matching to the birefringent retardation of the liquid crystal display device is not achieved in the transmission mode, thereby resulting in unwanted colors or the like.

The angle $\phi_{RF3}$ lies preferably in the range from about 65 to 75 degrees in the counterclockwise direction when viewed from above.

As shown in FIGS. 3 and 4, the foregoing second polarizer 16 has an absorption axis ε which forms an angle ($\phi_{pol2}$) lying in the range from about 10 to 40 degrees with respect to the foregoing reference direction X in the counterclockwise direction when viewed from above (from the observer's side, that is, from the side opposite to the backlight unit 300).

When the absorption axis ε is not set in the foregoing range, polarization matching to the birefringent retardation of the liquid crystal display device is not achieved in the transmission mode, thereby resulting in unwanted colors or the like.

The angle $\phi_{pol2}$ lies preferably in the range from about 20 to 30 degrees in the counterclockwise direction when viewed from above.

As shown in FIGS. 3 and 4, an angle formed by the slow axis δ of the third retardation film 13 and the absorption axis ε of the second polarizer 16 is set in the range from about 30 to 50 degrees. When the angle formed by the slow axis δ and the absorption axis ε is not set in the foregoing range, polarization matching to the birefringent retardation of the liquid crystal display device is not achieved in the transmission mode, thereby resulting in unwanted colors or the like.

The backlight unit 300 is formed by a transparent light guide plate 301, a reflecting tube 303 which has a U-shaped cross section and which is disposed so as to oppose one of the side surfaces of the light guide plate 301, a white light source 302, such as a cold cathode fluorescent lamp (CCFL), a white light emitting diode, or the like, housed in the reflecting tube 303, and a reflecting plate 304 disposed on an external surface (the lower surface in the figure) of the light guide plate 301.

In the STN-type transflective liquid-crystal display device 201 according to the embodiment, performing a duty of about 1/200 (corresponding to matrix driving with 200 scanning lines), the liquid crystal layer 34 is composed of a liquid crystal composition having a positive dielectric anisotropy, and the liquid crystal composition is sandwiched by the pair of transparent substrates 11 and 12 while being twisted by about 220 to 260 degrees. Also, in the liquid crystal display device having the optical compensating plate and the polarizer respectively formed above and below the liquid crystal cell 1, the transflector 30 is formed on the inner surface of the transparent substrate 11 of the liquid crystal cell 1, the transflector 30 has the high-reflectivity film 36 having the plurality of fine apertures 36b therein, and the high-reflectivity film 36 has the diffuse reflection surface 36c, on the surface thereof, having a reflected luminance characteristic controlled so as to exhibit a curve having a substantially flat portion in its high reflected luminance region. With this structure, in the reflection mode, a reflection display having a high reflected luminance over a wide viewing angle is achieved, and, in the transmissive mode, an excellent transmission display in which the transmittivity of transmitted light does not vary over a wide viewing angle is obtained.

In the transflective liquid-crystal display device according to the embodiment, by setting the optical conditions of the liquid crystal layer 34, the liquid crystal cell 1, the first, second, and third retardation films 14, 15, and 13, and the first and second polarizers 17 and 16 as described above, in the reflection mode, a bright color display having especially good contrast in the observing angle range and good color reproducibility is obtained, and also, in the transmission mode, a bright color display having good contrast and good color reproducibility is obtained.

Although the liquid crystal display device according to the embodiment has a screen 205 which is wider than it is long, it may have a screen which is longer than it is wide. The upper and lower transparent substrates are not limited to glass substrates but they may be formed from a film-like base member such as a transparent resin substrate.

Also, although the upper alignment film 26 and the transparent electrodes 24 have the top coating interposed therebetween, the top coating is not always necessary and may be provided depending on the type or the required characteristics of the liquid crystal display device.

In addition, although the transflective liquid-crystal display device according to the embodiment is a color liquid-crystal display device, it may be a black-and-white transflective liquid-crystal display device in which the color filter layer is not disposed.

EXAMPLES

The present invention will be described in further detail by using Examples and a Comparative Example; however, the present invention is not limited to these Examples.

Experimental Example 1

The reflected luminance characteristic, in the reflection mode, of the transflective liquid-crystal display device according to the embodiment shown in FIGS. 1 to 5 was measured.

In this experiment, the alignment films on the inner surfaces of the upper and lower glass substrates were aligned so as to form a left spiral twist of 250 degrees between the upper and lower glass substrates (by mixing a small amount of cholesteryl nanoate as a chiral dopant into the liquid crystal composition) so that the viewing direction is toward the proximal side (in the direction of six o'clock on the clock dial).

Liquid crystal used in the liquid crystal layer has a positive dielectric anisotropy ($\epsilon \| =15.0$ and $\epsilon \perp =4.1$ at a temperature of 20° C.), a birefringence $\Delta n=0.121$ (at a temperature of 20° C. and a measuring wavelength 589 nm), a steepness index $\lambda=1.036$ (at a temperature of 20° C., with a transmissive yellow mode display, and measured in a direction orthogonal to the liquid crystal cell).

A transflector is formed such that a photosensitive acrylic resin (made by JSR Corp.) is coated on the lower substrate by spin coating so as to provide a film having a thickness of about 2.0 to 3.0 $\mu$m, and then the upper surface of the film is provided with concavities and convexities by exposure and developing. The concavities and convexities have a depth in the range from about 0.5 to 3.0 $\mu$m, and their shapes in plan view are approximate circles having diameters in the range from 5 to 40 $\mu$m or ellipses. The concavities and convexities are formed by disposing these shapes, without substantially leaving spaces, in a random manner or a substantially random manner in a predetermined region.

By sputtering an Al—Nd-based metal film at low temperature on the upper surface of the base member having the concavities and convexities as described above, the high-reflectivity film having a thickness of about 150 nm (1500 Å) is formed. The reflected luminance characteristic of the upper surface (diffuse reflection surface) of the high-reflectivity film is shown in FIG. 8.

Figure 11:
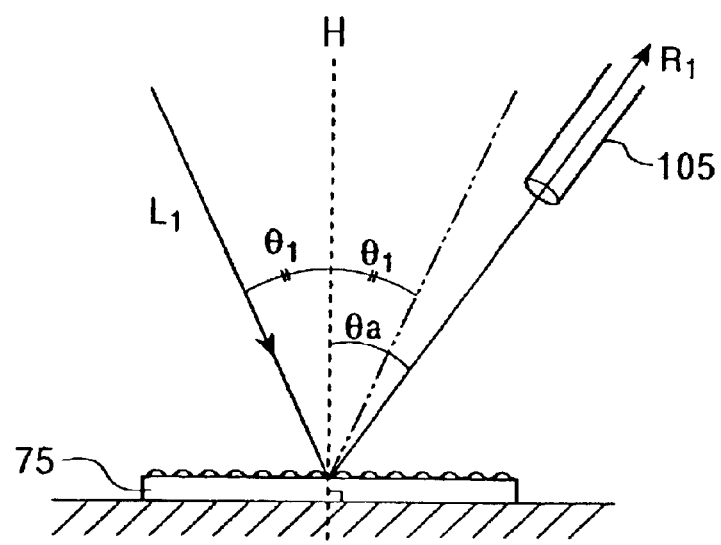
FIG. 11 illustrates a method for measuring the reflected luminance characteristic of the transflector shown in FIG. 10.

The reflected luminance characteristic shows the relationship between acceptance angle $\theta_a$ and the reflected luminance (relative value) which were measured by changing the acceptance angle $\theta_a$ from −10 to 70 degrees, in the same manner as in the measuring method shown in FIG. 11, when incident light (external light) $L_1$ entered at an incident angle of −30 degrees (with respect to the normal, the incident side is defined as a negative angle and the observation side is defined as a positive), and the photo detector 105 detected the reflected light R1 which was part of the incident light L1 reflected at the upper surface of the high-reflectivity film (metal film). The measured results are shown in FIG. 8. In FIG. 8, the curve (4) shows the reflected luminance characteristic representing a case in which a part of the plurality of fine concavities formed on the diffuse reflection surface, without substantially leaving spaces, in a random manner are formed so as to have concave surfaces with different curvatures so that the fine concavities are provided with asymmetric sectional shapes. Also, the curve (5) shows the characteristic representing a case in which the fine concavities are not provided with asymmetric sectional shapes.

Figure 12A:
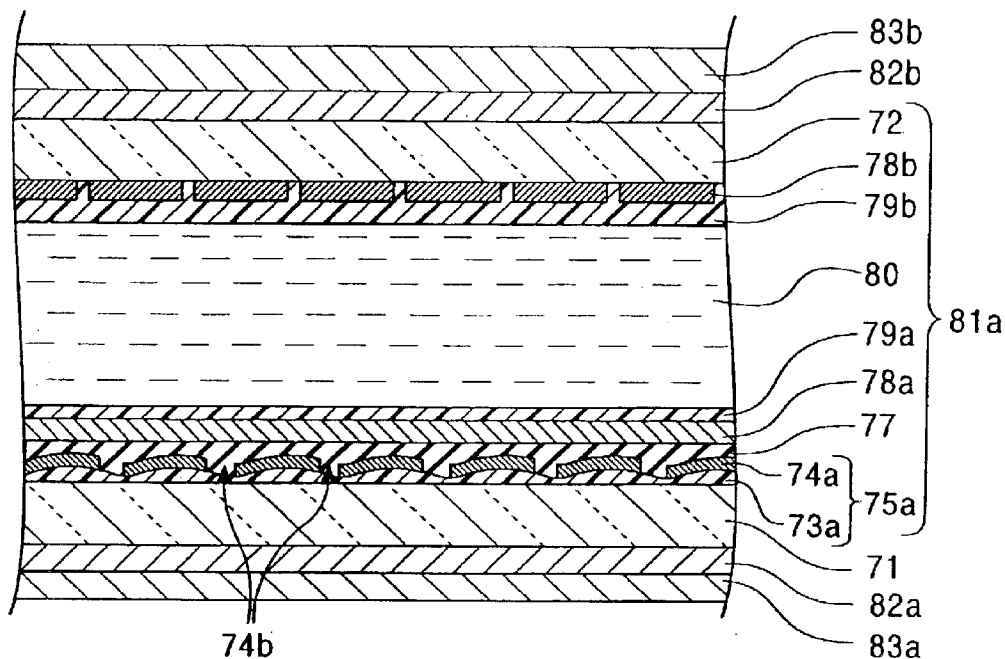
FIG. 12A illustrates a partial sectional structure of another known liquid crystal display device having a built-in transflector.
Figure 12B:
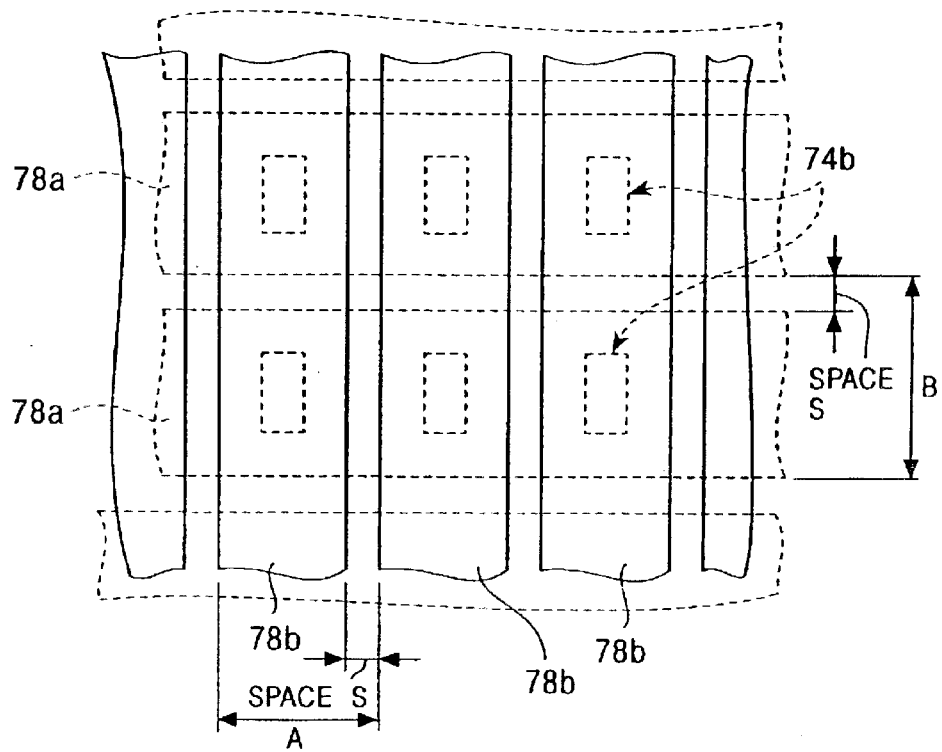
FIG. 12B is a plan view illustrating the positional relationships between apertures and upper and lower transparent electrodes of the liquid crystal display device when viewed from the observer's side.

Also, for comparison, the reflected luminance characteristic of a liquid crystal display device, as shown in FIGS. 12A and 12B, having a conventional transflector included therein whose reflected luminance characteristic is substantially symmetric with respect to the acceptance angle of the specular reflecting direction, was measured in the same manner as in the foregoing method. The measured results are shown by a curve (6) in FIG. 8.

In addition, the transflector was obtained by forming a fine aperture in the prepared high-reflectivity film at each pixel by lithography so as have an aperture ratio of 25%, as shown in FIG. 5.

Subsequently, the color filter layer, the planarizing film, the transparent electrodes, and the alignment film were laminated on the transflector.

Also, the other transparent electrodes and the other alignment film were formed on the inner surface of the upper glass substrate.

The liquid crystal cell was provided by maintaining the gap (cell gap) between the upper and lower glass substrates at about 5.9 μm (where, the birefringent retardation $\Delta nd_{LC}$ of the liquid crystal cell is nearly equal to 714 nm).

Figure 7:
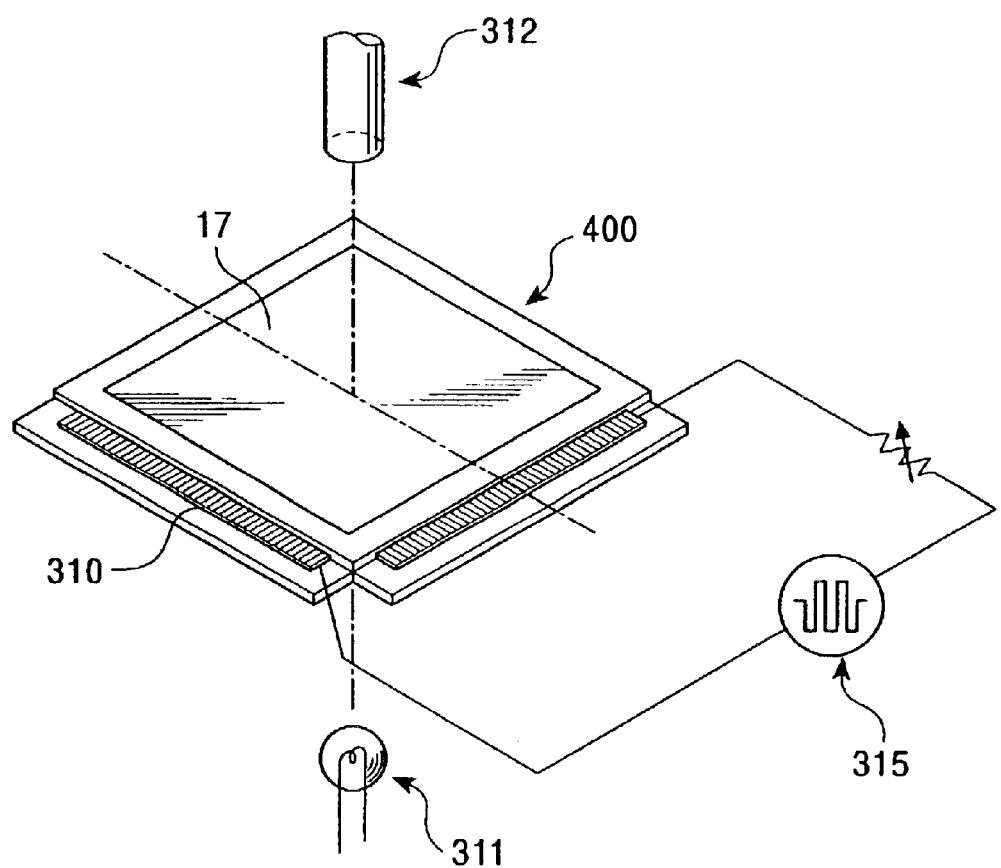
FIG. 7 illustrates a method for measuring electro-optical characteristics of Example 1 of a liquid crystal device using a 1/160-duty drive waveform.

A liquid crystal display device 400 of Example 1, as shown in FIG. 7, was obtained by disposing first and second retardation films and a first polarizer above the liquid crystal cell formed as described above and by disposing a third retardation film and a second polarizer below the liquid crystal cell so as to satisfy the optical conditions shown in FIG. 3, and by connecting a TCP (tape carrier package) drive IC to a panel terminal portion 310 of the liquid crystal display device.

With a measuring device (LCD7000, made by Otsuka Electronics Co.) shown in FIG. 7, the electro-optical characteristic of the liquid crystal display device 400 of Example 1 was measured by applying a 1/160-duty drive waveform (a frame frequency of 70 Hz) with an alternating drive source 315 when a light source 311, disposed below the liquid crystal display device 400 in the normal direction, emitted white light and a photo sensor 312, disposed above the liquid crystal display device 400 in the normal direction, detected the emitted white light over the angle range of ±45 degrees with respect to the normal. In the transmission configuration, the light source 311 and the photo sensor 312 were disposed as described above.

Also, the electro-optical characteristic of the liquid crystal display device 400 was measured by applying the 1/160-duty drive waveform (a frame frequency of 70 Hz) when the light source 311, disposed above the liquid crystal display device 400, emitted white light onto the liquid crystal display device 400 at an incident angle 20 degrees (20 degrees from the normal) and the photo sensor 312 detected the reflected light over the acceptance angle range from 0 to 40 degrees (0 to 40 degrees from the normal). In the reflective configuration, the light source 311 and the photo sensor 312 were disposed as described above.

With this arrangement, in the liquid crystal display device of the Example 1, in the reflective configuration, the measured reflectance was 32% or more (relative to the reflectance 10% at the standard white plate) throughout the acceptance angle range (from 0 to 45 degrees) and the measured contrast was 13 or more while the maximum contrast was 32. Also, in the transmissive configuration, the measured transmittance (relative to the transmittance 100% of air) was in the range from 1.5% to 2.5% and the measured contrast was 25 or more. In particular, over the acceptance angle range from 0 to 20 degrees, the transmittance was 1.8% to 2.2% and the contrast was 28 or more while the maximum contrast was 40.

Experimental Example 2

Liquid crystal display devices of Examples 2 to 12 were fabricated in the same fashion as that of Experimental Example 1 except for the optical conditions shown in Tables 1 and 2 satisfied by first to third retardation films and first and second polarizers. Tables 1 and 2 show the measured results of reflectance and contrast in the reflection mode and those of transmittance and contrast in the transmission mode of the liquid crystal display devices of the Examples 2 to 12.

TABLE 1

| | Item | Example 2 | Example 3 | Example 4 | Example 5 | Example 6 | Example 7 | Example 8 | Example 9 |
|---|---|---|---|---|---|---|---|---|---|
| Conditions | | | | | | | | | |
| 1st polarizer | Absorption axis axis angle | 42° | 42° | 45° | 45° | 42° | 40° | 45° | 42° |
| 2nd retardation film | Retardation Slow axis angle | 375 nm 113° Z = 0.3 | 375 nm 113° Z = 0.5 | 380 nm 117° | 380 nm 117° | 370 nm 115° | 365 nm 110° | 360 nm 105° | 380 nm 117° |

TABLE 1-continued

| Item | | Example 2 | Example 3 | Example 4 | Example 5 | Example 6 | Example 7 | Example 8 | Example 9 |
|---|---|---|---|---|---|---|---|---|---|
| 1st retardation film | Retardation | 170 nm | 170 nm | 170 nm | 170 nm | 165 nm | 165 nm | 160 nm | 170 nm |
| | Slow axis angle | 80° | 79° | 79° | 79° | 80° | 75° | 72° | 79° |
| liquid crystal cell | Retardation | 720 nm | 725 nm | 710 nm | 705 nm | 700 nm | 702 nm | 715 nm | 725 nm |
| | Twist angle | 250° | 250° | 250° | 250° | 250° | 250° | 240° | 250° |
| | Steepness index λ | 1.038 | 1.037 | 1.036 | 1.035 | 1.038 | 1.036 | 1.039 | 1.035 |
| 3rd retardation film | Retardation | 130 nm | 125 nm | 125 nm | 125 nm | 122 nm | 120 nm | 125 nm | 122 nm |
| | Slow axis angle | 60° | 65° | 65° | 70° | 83° | 85° | 63° | 60° |
| 2nd polarizer | Absorption axis axis angle | 30° | 25° | 30° | 38° | 38° | 40° | 28° | 28° |
| Measured results | | | | | | | | | |
| Aperture ratio | | 27% | 25% | 22% | 22% | 25% | 25% | 25% | 25% |
| Reflection mode | Viewing angle | 0°–40° | 0°–40° | 0°–40° | 0°–40° | 0°–35° | 0°–40° | 0°–40° | 0°–40° |
| | Reflectance | 34% or more | 36% or more | 34% or more | 32% or more | 32% or more | 33% or more | 34% or more | 35% or more |
| | Contrast | 12.1 or more | 13.4 or more | 12.2 or more | 12 or more | 12.3 or more | 12.2 or more | 13.1 or more | 12.8 or more |
| Transmission mode | Viewing angle | ±25° | ±25° | ±25° | ±25° | ±25° | ±25° | ±25° | ±25° |
| | Reflectance | 1.90% | 1.90% | 1.70% | 1.70% | 1.80% | 1.70% | 1.90% | 1.70% |
| | Contrast | 25 or more | 28 or more | 27 or more | 26 or more | 29 or more | 28 or more | 27 or more | 26 or more |
| Maximum contrast | Reflection mode | 20 | 23 | 21 | 21 | 20 | 20 | 21 | 23 |
| | Transmission mode | 35 | 38 | 36 | 36 | 40 | 39 | 37 | 36 |

TABLE 2

| Item | | Example 10 | Example 11 | Example 12 |
|---|---|---|---|---|
| Conditions | | | | |
| 1st polarizer | Absorption axis axis angle | 40° | 47° | 40° |
| 2nd retardation film | Retardation | 375 nm | 375 nm | 375 nm |
| | Slow axis angle | 112° Z = 0.3 | 117° Z = 0.3 | 113° Z = 0.5 |
| 1st retardation film | Retardation | 170 nm | 170 nm | 170 nm |
| | Slow axis angle | 77° Z = 0.5 | 79° Z = 0.5 | 76° |
| liquid crystal cell | Retardation | 715 nm | 715 nm | 710 nm |
| | Twist angle | 250° | 250° | 250° |
| | Steepness index λ | 1.065 | 1.038 | 1.07 |
| 3rd retardation film | Retardation | 125 nm | 125 nm | 122 nm |
| | Slow axis angle | 70° | 70° | 70° |
| 2nd polarizer | Absorption axis axis angle | 25° | 25° | 25° |
| Measured results | | | | |
| | Aperture ratio | 25% | 25% | 25% |
| Reflection mode | Viewing angle | 0°–40° | 0°–40° | 0°–40° |
| | Reflectance | 30% | 30% | 30% |
| | Contrast | 25 | 25 | 20 |
| Transmission mode | Viewing angle | ±25° | ±25° | ±25° |
| | Reflectance | 2% or more | 2% or more | 2% or more |
| | Contrast | 25 | 30 | 25 |
| Maximum contrast | Reflection mode | 30 | 30 | 25 |
| | Transmission mode | 35 | 40 | 35 |

In Tables 1 and 2, the aperture ratios are those of the apertures formed in the high-reflectivity films, the steepness indexes λ are those of transmitted luminance vs. voltage characteristics (the steepness indexes in Examples 2 to 9, and 11 were obtained by an APT drive method, and the steepness indexes in Examples 10 and 12 were obtained by an MLA drive method), and the values Z in the columns of the first and second retardation films indicate Z-coefficients.

What is claimed is:

1. A transflective liquid-crystal display device comprising:
   a liquid crystal cell, the liquid crystal cell containing:
   a liquid crystal layer;
   a pair of mutually opposing transparent substrates sandwiching the liquid crystal layer;
   transparent electrodes and an alignment film formed close to an inner surface of one of the transparent substrates in that order;
   other transparent electrodes and another alignment film formed close to an inner surface of the other transparent substrate in that order; and
   a transflector disposed close to the one transparent substrate;
   a first optical compensating plate and a first polarizer formed close to an outer surface of the other transparent substrate in that order;
   a second optical compensating plate and a second polarize formed close to an outer surface of the one transparent substrate in that order; and an illuminator that is disposed close to an outer surface of the second polarizer and which emits light toward the liquid crystal cell, wherein the liquid crystal layer contains a liquid crystal composition which has a positive dielectric anisotropy, which is twisted by about 220 to 260 degrees, and which is sandwiched by the pair of transparent substrates, wherein the transflector contains a high-reflectivity film having a plurality of fine apertures therein and the high-reflectivity film contains a diffuse reflection surface, on the surface thereof, whose reflected luminance characteristic is controlled, wherein the first optical compensating plate formed close to the outer surface of the other transparent substrate comprises first and second retardation films, and the second optical compensating plate formed close to the outer surface of the one transparent substrate comprises a third retardation film, wherein, when an alignment direction a of the alignment film close to the other transparent substrate and an alignment direction b of the alignment film close to the one transparent substrate are viewed from above, a reference direction X lies between the alignment directions a and b, passes through an intersection O of the alignment directions a and b, and also extends along a line bisecting an inner angle formed by the alignment directions a and b, wherein at a measuring wavelength of 546 nm and with respect to the reference direction X in a counterclockwise direction when viewed from above:

the first retardation film has a birefringent retardation ($\Delta nd_{RF1}$) of about 150 to 190 nm, and a slow axis β which forms an angle ($\Phi_{RF1}$) of about 65 to 95°, the second retardation film has a birefringent retardation ($\Delta nd_{RF2}$) of about 350 to 400 nm, and a slow axis γ which forms an angle ($\Phi_{RF2}$) of about 90 to 135°, the first polarizer has an absorption axis α which forms an angle ($\Phi_{pol1}$) of about 35 to 55°, the third retardation film has a birefringent retardation ($\Delta nd_{RF3}$) of about 115 to 135 nm, and a slow axis δ which forms an angle ($\Phi_{RF3}$) of about 55 to 85°, and the second polarizer has an absorption axis ε which forms an angle ($\Phi_{pol2}$) of about 10 to 40°; and wherein an angle formed by the slow axis δ of the third retardation film and the absorption axis ε of the second polarizer is about 30 to 50°.

2. The transflective liquid-crystal display device according to claim 1, wherein the liquid crystal cell comprises a color filter layer close to the inner surface of either one of the pair of transparent substrates.

3. The transflective liquid-crystal display device according to claim 2, wherein the color filter layer is formed on the high-reflectivity film of the transflector.

4. The transflective liquid-crystal display device according to claim 1, wherein the liquid crystal composition used in the liquid crystal layer has a transmitted luminance vs. voltage characteristic with a steepness index lying in the range from about 1.030 to 1.075, and the liquid crystal cell has birefringent retardation ($\Delta nd_{LC}$) lying in the range from about 690 to 735 nm at a measuring wavelength of 589 nm.

5. The transflective liquid-crystal display device according to claim 4, wherein the birefringent retardation ($\Delta nd_{LC}$) of the liquid crystal cell lies in the range from about 700 to 730 nm at a measuring wavelength of 589 nm.

6. The transflective liquid-crystal display device according to claim 4, wherein the angle ($\Phi_{pol1}$) formed by the absorption axis α of the first polarizer with respect to the reference direction X lies in the range from about 40 to 50 degrees in the counterclockwise direction when viewed from above.

7. The transflective liquid-crystal device according to claim 4, wherein the birefringent retardation ($\Delta nd_{RF1}$) of the first retardation film lies in the range from about 155 to 185 nm at a measuring wavelength of 54 nm, and also the angle ($\Phi_{RF1}$) formed by the slow axis β of the first retardation film with respect to the reference direction X lies in the range from about 70 to 90 degrees in the counterclockwise direction when viewed from above.

8. The transflective liquid-crystal display device according to claim 4, wherein the birefringent retardation ($\Delta nd_{RF2}$) of the second retardation film lies in the range from about 360 to 400 nm at a measuring wavelength of 546 nm, and also the angle ($\Phi_{RF1}$) formed by the slow axis γ of the second retardation film with respect to the reference direction X lies in the range from about 100 to 130 degrees in the counterclockwise direction when viewed from above.

9. The transflective liquid-crystal display device according to claim 1, wherein the high-reflectivity film comprises one of an Al-based and Ag-based metal film.

10. The transflective liquid-crystal display device according to claim 1, wherein an aperture ratio of each fine aperture lies in the range from about 15% to 35% with respect to an area of one pixel pitch of the liquid crystal cell.

11. The transflective liquid-crystal display device according to claim 4, wherein the liquid crystal composition has a transmitted luminance vs. voltage characteristic whose steepness index lies in the range from about 1.030 to 1.060 when driven by a voltage averaging method.

12. The transflective liquid-crystal display device according to claim 4, wherein the liquid crystal composition has a transmitted luminance vs. voltage characteristic whose steepness index lies in the range from about 1.040 to 1.075 when driven by a multi-line addressing method.

13. The transflective liquid-crystal display device according to claim 1, wherein the high-reflectivity film has a reflected luminance characteristic in which the diffuse reflection surface has a high reflected luminance region with a substantially flat portion.

14. The transflective liquid-crystal display device according to claim 1, wherein the diffuse reflection surface has curved surfaces with slopes that are discontinuous between adjacent curved surfaces, the adjacent curve surfaces being formed such that substantially no space exists between the adjacent curved surfaces.

15. The transflective liquid-crystal display device according to claim 14, wherein each curved surface has an asymmetrical sectional shape.

16. A method of fabricating a transflective liquid-crystal display device comprising:

introducing a liquid crystal layer between a first and a second transparent substrate and limiting the liquid crystal layer to having a liquid crystal composition of a positive dielectric anisotropy and which is twisted by about 220 to 260 degrees;

forming a transflector on an inner surface of the first transparent substrate, forming a plurality of fine apertures in a high-reflectivity film of the transflector thereby forming a diffuse reflection surface on the transflector, controlling a reflected luminance characteristic of the diffuse reflection surface such that the diffuse reflection surface has a high reflected luminance region with a substantially flat portion, and planarizing the transflector by covering the fine aperture with a planarizing film;

forming a first set of transparent electrodes and a first alignment film on an inner surface of the transflector, a first optical compensating plate and a first polarizer on an outer surface of the first transparent substrate, a second set of transparent electrodes and a second alignment film on an inner surface of the second transparent substrate, and a second optical compensating plate and a second polarizer on an outer surface of the second transparent substrate; and placing a backlight proximate to an outer surface of the second polarizer, incorporating first and second retardation films in the first optical compensating plate and incorporating a third retardation film in the second optical compensating plate;

limiting a first alignment direction a of the first alignment film and a second alignment direction b of the second alignment film such that as viewed from above, a reference direction X lies between the alignment directions a and b, passes through an intersection O of the alignment directions a and b, and also extends along a line bisecting an inner angle formed by the alignment directions a and b;

at a measuring wavelength of 546 nm and with respect to the reference direction X in a counterclockwise direction when viewed from above:

limiting a birefringent retardation ($\Delta nd_{RF1}$) of the first retardation film from about 150 to 190 nm, and a slow axis β which forms an angle ($\Phi_{RF1}$) from about 65 to 95°;

limiting a birefringent retardation ($\Delta n_{RF2}$) of the second retardation film from about 350 to 400 nm, and a slow axis γ which forms an angle ($\Phi_{RF2}$) from about limiting an absorption axis α of the first polarizer which forms an angle ($\Phi_{pol1}$) from about 35 to 55°, limiting a birefringent retardation ($\Delta nd_{RF3}$) of the third retardation film from about 115 to 135 nm and a slow axis δ which forms an angle ($\Phi_{RF3}$) from about 55 to 85°, and limiting an absorption axis ε of the second polarizer which forms an angle ($\Phi_{pol2}$) from about 10 to 40°; and limiting an angle formed by the slow axis δ of the third retardation film and the absorption axis ε of the second polarizer from about 30 to 50°.

17. The method according to claim 16, further comprising forming a color filter layer proximate to the inner surface of either of first and second transparent substrates.

18. The method according to claim 17, further comprising forming the color filter layer on the high-reflectivity film of the transflector nor to planarizing the transflector.

19. The method according to claim 16, further comprising:

limiting a steepness index of a transmitted luminance vs. voltage characteristic of the liquid crystal composition of the liquid crystal layer to about 1.030 to 1.075 and limiting a birefringent retardation ($\Delta nd_{LC}$) from about 690 to 735 nm at a measuring wavelength of 589 nm.

20. The method according to claim 19, further comprising limiting the birefringent retardation ($\Delta nd_{LC}$) of the liquid crystal cell from about 700 to 730 nm at a measuring wavelength of 589 nm.

21. The method according to claim 19, further comprising limiting the angle ($\Phi_{pol1}$) formed by the absorption axis α of the first polarizer with respect to the reference direction X from about 40 to 50 degrees in the counterclockwise direction when viewed from above.

22. The method according to claim 19, further comprising limiting the birefringent retardation ($\Delta nd_{RF1}$) of the first retardation film from about 155 to 185 nm at a measuring wavelength of 546 nm, and the angle ($\Phi_{RF1}$) formed by the slow axis β of the first retardation film with respect to the reference direction X from about 70 to 90 degrees in the counterclockwise direction when viewed from above.

23. The method according to claim 19, further comprising limiting the birefringent retardation ($\Delta nd_{RF2}$) of the second retardation film from about 360 to 400 nm at a measuring wavelength of 546 nm, and the angle ($\Phi_{RF1}$) formed by the slow axis β of the second retardation film with respect to the reference direction X from about 100 to 130 degrees in the counterclockwise direction when viewed from above.

24. The method according to claim 16, further comprising limiting an aperture ratio of each fine aperture from about 15% to 35% with respect to an area of one pixel pitch of the liquid crystal cell.

25. The method according to claim 19, further comprising driving the liquid crystal by a voltage averaging method and limiting the steepness index of the transmitted luminance vs. voltage characteristic of the liquid crystal composition of the liquid crystal layer from about 1.030 to 1.060 when driven by the voltage averaging method.

26. The method according to claim 19, further comprising driving the liquid crystal by a multi-line addressing method and limiting the steepness index of the transmitted luminance vs. voltage characteristic of the liquid crystal composition of the liquid crystal layer from about 1.040 to 1.075 when driven by the multi-line addressing method.

27. The method according to claim 16, further comprising limiting a steepness index of a transmitted luminance vs. voltage characteristic of the liquid crystal composition of the liquid crystal layer to different ranges dependent on the method used to drive the liquid crystal layer.

28. The method according to claim 16, further comprising forming the high-reflectivity film such that the diffuse reflection surface has a high reflected luminance region with a substantially flat portion.

29. The method according to claim 16, further comprising forming the diffuse reflection surface to have curved surfaces with slopes that are discontinuous between adjacent curved surfaces and such that substantially no space exists between the adjacent curved surfaces.

30. The method according to claim 16, further comprising forming the diffuse reflection surface such that each curved surface has an asymmetrical sectional shape.

31. A transflective liquid-crystal display device comprising:

a liquid crystal cell, the liquid crystal cell containing:

a liquid crystal layer;

a pair of mutually opposing transparent substrates sandwiching the liquid crystal layer;

transparent electrodes and alignment films disposed on first sides of the transparent substrates;

optical compensating plates and polarizers formed on second sides of the transparent substrates;

a transflector disposed on one of the transparent substrates, the transflector containing a high-reflectivity film having a plurality of fine apertures and a diffuse reflection surface; and an illuminator that emits light toward the liquid crystal cell disposed on one of second polarizers, wherein the diffuse reflection surface has curved surfaces with slopes that are discontinuous between adjacent curved surfaces, the adjacent curved surfaces are disposed such that substantially no space exists between the adjacent curved surfaces and have asymmetrical sectional shapes with respect to normal to the substrates.

32. The transflective liquid-crystal display device according to claim 31, wherein an aperture ratio of each fine aperture is about 15% to 35% with respect to an area of one pixel pitch of the liquid crystal cell.

33. The transflective liquid-crystal display device according to claim 31, wherein a reflected luminance characteristic of the device is substantially rectangular and has a high reflected luminance region that is substantially flat and devoid of sharp peaks.

34. The transflective liquid-crystal display device according to claim 31, wherein the liquid crystal composition has a transmitted luminance vs. voltage characteristic with a steepness index of about 1.03 to 1.06 when driven b a voltage averaging method.

35. The transflective liquid-crystal display device according to claim 31, wherein the liquid crystal composition has a transmitted luminance vs. voltage characteristic whose steepness index lies in the range from about 1.040 to 1.075 when driven by a multi-line addressing method.

36. The transflective liquid-crystal display device according to claim 31, wherein the substrate on which the transflector is disposed is thinner than the substrate opposing the substrate on which the transflector is disposed.

37. The transflective liquid-crystal display device according to claim 36, wherein the substrate on which the transflector is disposed has a thickness of about 0.1 to 0.3 mm.

38. The transflective liquid-crystal display device according to claim 31, wherein the liquid crystal cell has a birefringent retardation ($\Delta nd_{LC}$) of about 690 to 735 nm at a temperature of 25° C. and a measuring wavelength of 589 nm.

* * * * *

UNITED STATES PATENT AND TRADEMARK OFFICE
CERTIFICATE OF CORRECTION

PATENT NO. : 6,816,217 B2
DATED : November 9, 2004
INVENTOR(S) : Takehiko Sone

It is certified that error appears in the above-identified patent and that said Letters Patent is hereby corrected as shown below:

Column 24,
Line 65, after "a second" delete "polarize" and substitute -- polarizer -- in its place.

Column 26,
Line 12, after "wavelength of" delete "54" and substitute -- 546 -- in its place.
Line 21, after "the angle" delete "$(\Phi_{RF1})$" and substitute -- $(\Phi_{RF2})$ -- in its place.

Column 27,
Line 36, delete "$(\Delta n_{RF2})$" and substitute -- $(\Delta nd_{RF2})$ -- in its place.
Line 38, after "from about" insert -- 90º to 135º; --.
Line 56, after "transflector" delete "nor" and substitute -- prior -- in its place.

Column 28,
Line 16, delete "$(\Phi_{RF1})$" and substitute -- $(\Phi_{RF2})$ -- in its place.
Line 17, after "axis" delete "$\beta$" and substitute -- $\gamma$ -- in its place.

Column 30,
Line 1, after "when driven" delete "b" and substitute -- by -- in its place.

Signed and Sealed this

Twenty-fourth Day of May, 2005

JON W. DUDAS
*Director of the United States Patent and Trademark Office*